(12) United States Patent
Whitlock

(10) Patent No.: US 6,382,318 B1
(45) Date of Patent: May 7, 2002

(54) FILTER FOR SUBTERRANEAN USE

(75) Inventor: Michael B. Whitlock, Cortland, NY (US)

(73) Assignee: Weatherford/Lamb, Inc., Houston, TX (US)

( * ) Notice: Subject to any disclaimer, the term of this patent is extended or adjusted under 35 U.S.C. 154(b) by 0 days.

(21) Appl. No.: 09/405,173

(22) Filed: Sep. 24, 1999

Related U.S. Application Data

(63) Continuation-in-part of application No. PCT/US98/06649, filed on Apr. 3, 1998.
(60) Provisional application No. 60/042,631, filed on Apr. 4, 1997, provisional application No. 60/101,679, filed on Sep. 24, 1998, and provisional application No. 60/113,865, filed on Dec. 24, 1998.

(51) Int. Cl.[7] .............................................. E21B 43/04
(52) U.S. Cl. ........................ 166/278; 166/233; 166/236
(58) Field of Search ................................ 166/278, 227, 166/229, 228, 51, 369, 230, 235

(56) References Cited

U.S. PATENT DOCUMENTS

| | | | | |
|---|---|---|---|---|
| 90,787 | A | * 6/1869 | Smith et al. | 166/230 |
| 679,131 | A | * 7/1901 | Thompson | 166/231 |
| 713,544 | A | * 11/1902 | Ware | 166/230 |
| 1,342,986 | A | * 6/1920 | Cater | 166/230 |
| 1,520,376 | A | * 12/1924 | Verneuil | 166/230 |
| 2,530,223 | A | * 11/1950 | Breaux | 166/228 |
| 2,877,852 | A | * 3/1959 | Bashara | 166/230 |
| 2,985,241 | A | * 5/1961 | Hanslip | 166/230 |
| 5,190,102 | A | * 3/1993 | Arterbury et al. | 166/228 |
| 5,664,628 | A | * 9/1997 | Koehler et al. | 166/369 |

* cited by examiner

Primary Examiner—Frank S. Tsay
(74) Attorney, Agent, or Firm—Leydig, Voit & Mayer, Ltd.

(57) ABSTRACT

A filter for subterranean use includes a filter body containing a filter medium, and a restraining member disposed around the filter body. The inner periphery of the restraining member is sufficiently close to the outer periphery of the filter body to prevent the filter body from being damaged by radially outward forces encountered during operation of the filter within a well.

43 Claims, 19 Drawing Sheets

FILTER FOR SUBTERRANEAN USE

This United States Application is a continuation-in-part of International Application No. PCT/US98/06649, which was filed on Apr. 3, 1998, designated the United States of America, and claimed priority based on U.S. application Ser. No. 60/042,631, which was filed on Apr. 4, 1997. This United States Application also claims priority based on U.S. Application No. 60/101,679, which was filed on Sep. 24, 1998, and U.S. Application No. 60/113,865, which was filed on Dec. 24, 1998.

BACKGROUND OF THE INVENTION

1. Field of the Invention

This invention relates generally to filters for use in subterranean environments, such as in oil and gas wells, water wells, and geothermal wells, and in other environments in which it is desired to remove a liquid or gas from the ground without bringing soil particulates, such as sand or clay, up with the liquid or gas.

2. Description of the Related Art

There is much demand for well filters capable of being used in subterranean wells in order to remove particulates from liquids or gases produced by the wells. Typical particulates which need to be filtered out are sand and clay, and for this reason, such filters are often referred to as sand screens.

A well filter typically includes an inner support member, such as a perforated core, and a filter body including a filter medium disposed around the inner support member. In many cases, the well filter will further include an outer protective member, such as a perforated cage, disposed around the filter body for protecting it from abrasion and impacts. In order to facilitate installation of the cage over the filter body, there is usually a clearance between the outer periphery of the filter body and the inner periphery of the outer protective member.

During use of such a well filter in a well, fluid will usually flow radially inwards through the filter body during filtration, so the filter body will be subjected primarily to radially inward forces. However, on occasions, such as during acidizing of a well, injection of mud into a well, air sparging, or momentary pressure reversals (either intentional or accidental), fluid may flow radially outwards through the filter body, producing hoop stresses which stretch the filter medium in the filter body outwards towards the outer protective member. At such times, the pressure differential between the inside and the outside of the filter body during reverse flow may be extremely high, such as on the order of several thousand said greater on the inside than the outside. Because of the clearance between the outer periphery of the filter body and the inner periphery of the cage, there is a likelihood of the hoop stresses exceeding the strength of some portion of the filter body and producing excessive plastic elongation of the filter medium or damage to seams or joints of the filter body. Upon resumption of forward (outside-in) flow through the filter, the filter body may no longer be able to properly perform filtration because particles which should be removed by the filter medium are able to pass through regions which were damaged by the elongation of the filter medium or other portions of the filter body. Even if the filter body is not damaged by a single occurrence of radial expansion, if expansion takes place repeatedly, the filter body may suffer fatigue damage over time.

SUMMARY OF THE INVENTION

Accordingly, the present invention provides a filter for subterranean use which is capable of being subjected to radially outward forces without damage to a filter medium of the filter.

The present invention further provides methods of forming such a filter.

According to one form of the present invention, a filter includes a hollow filter body including a filter medium, and a restraining member disposed around the filter body.

The restraining member may restrain the filter body against radial expansion caused by radially outward forces encountered during operation of the filter within a well and prevent the filter body from exceeding its maximum allowable elongation, whereby the filter body can be prevented from being damaged by radial expansion. The filter may also include an inner support member surrounded by the filter body and capable of transporting a fluid in its axial direction.

The inner periphery of the restraining member may be in contact with the outer periphery of the filter body when no external radial forces are acting on the filter, or it may be spaced from the outer periphery of the filter body by a gap. Any gap is preferably sufficiently small that the filter body can expand against the inner surface of the restraining member without exceeding the maximum allowable elongation of the filter body. The maximum allowable elongation is the maximum elongation (expressed as strain) at which the filter body can still remove particles of a given size with a desired efficiency.

The restraining member may have a variety of forms. For example, it may be a perforated cage or a wrap member which is helically wrapped around the filter body. The wrap member may define openings through which particles at least as large as 0.015 inch in diameter can pass. The wrap member may be wrapped around the filter body in several turns and may radially compress the filter body. The wrap member may have a non-circular cross section and may be twisted along its longitudinal axis.

According to another form of the present invention, a filter includes a hollow filter body and a perforated cage surrounding the filter body. The filter body includes a metallic filter medium capable of resisting tension in a circumferential direction. An outer periphery of the filter body is able to contact an inner periphery of the cage around an entire circumference of the filter body without exceeding a maximum allowable elongation of the filter body. An inner diameter of the cage increases towards lengthwise ends of the cage.

According to still another form of the present invention, a method of forming a filter includes disposing a perforated cage around a filter body including a filter medium, and plastically deforming the cage radially inwards to reduce an inner diameter of the cage. For example, the inner diameter of the cage may be reduced to a level such that the filter body can contact the inner periphery of the cage without exceeding the maximum allowable elongation of the filter body.

A filter according to the present invention can be employed in any desired manner in a wide variety of underground environments, such as in oil or gas wells, water wells, geothermal wells, groundwater remediation wells, and leaching ponds. For example, the filter can be used in cased hole gravel pack completion in which the filter is disposed inside a gravel pack in the production zone of an oil or gas well, in an open hole gravel pack in which the filter is disposed in a gravel pack without being surrounded by casing, in filtration without a gravel pack, in open hole completion in which the filter is introduced into a well as part of a well string and the formation surrounding the well bore is allowed to fall in on the filter, in slim hole completion in which the filter is installed in a drill string and left in the well with the drill string at the completion of drilling, in coiled tubing completions and workovers in which the filter is connected to coiled tubing, with wire-line in which the filter is lowered into a well by wire-line and sealed in place in the well, for pump protection in which the filter is installed on or upstream of the inlet of a subsurface pump, in ground remediation in which underground fluids are brought to the surface via the well or compressed air is passed through the filter to form air bubbles and perform air sparging, and in leaching ponds for filtering ion-containing liquids which leach from ores in the pond. Details of the manner of using the filter in these and other environments are described in U.S. Pat. No. 5,664,628, which is incorporated by reference.

DESCRIPTION OF PREFERRED EMBODIMENTS

Figure 1:
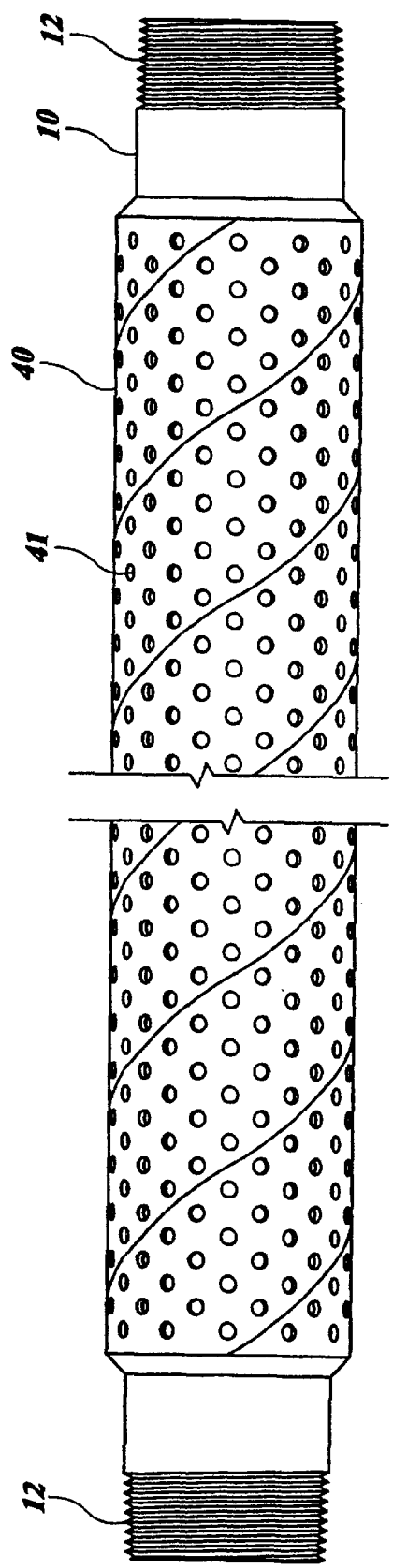
FIG. 1 is a plan view of an embodiment of a filter according to the present invention.
Figure 2:
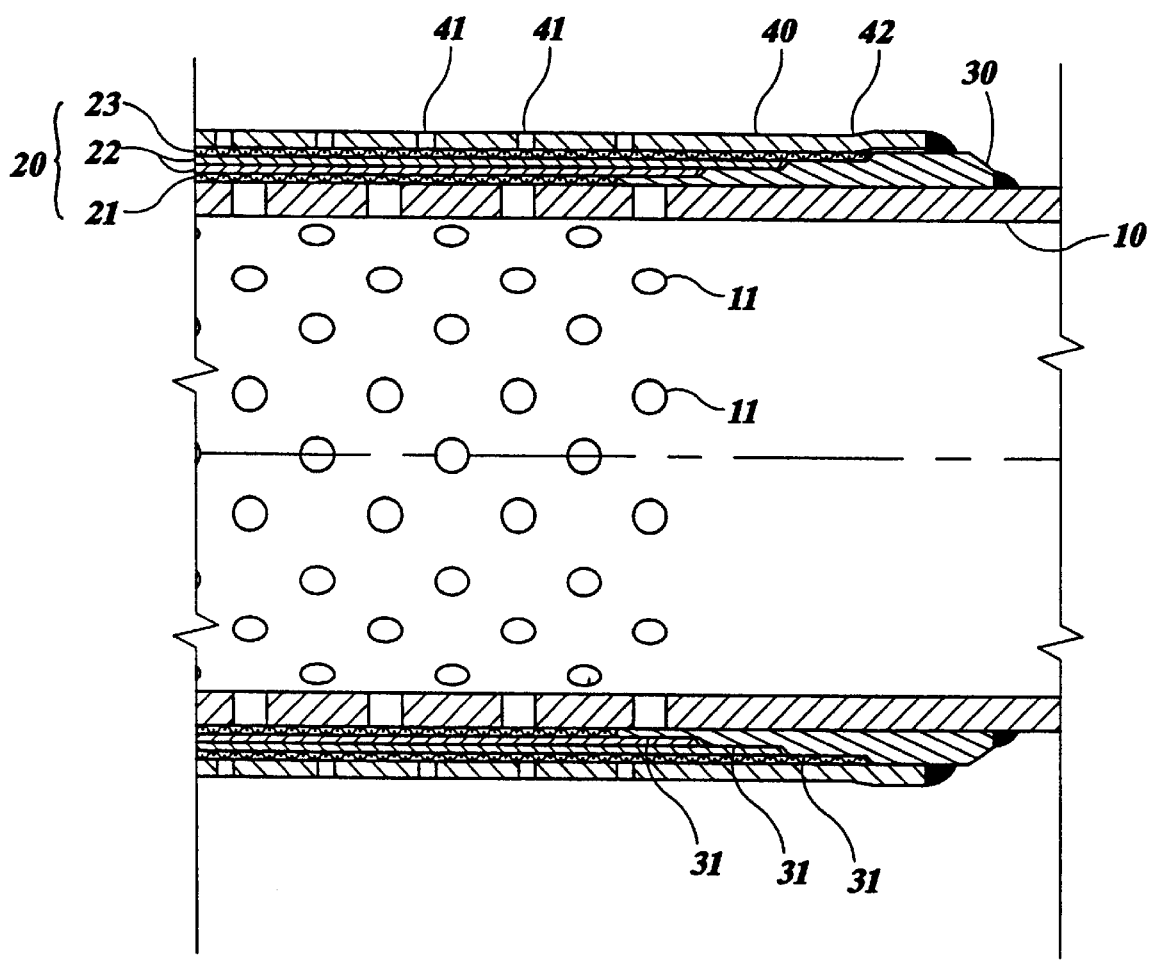
FIG. 2 is a longitudinal cross-sectional view of a portion of the filter of FIG. 1.

A number of embodiments of a filter according to the present invention will now be described with reference to the accompanying drawings. FIG. 1 is a plan view of a first embodiment of a filter according to the present invention, and FIG. 2 is an enlarged longitudinal cross-sectional view of a portion of the filter of FIG. 1. As shown in these drawings, this embodiment includes an inner member 10, a filter body 20 surrounding the inner support member 10 and containing a filter medium, and a restraining member in the form of a cage 40 surrounding the filter body 20 for preventing damage to the filter medium in the filter body 20 when the filter body 20 is subjected to radially outward forces.

The inner support member 10 provides rigidity to the filter and serves to axially transport fluid between the filter and another member to which the filter is connected. For example, when the filter is used for outside-in filtration, the inner support member 10 can transport filtrate which has passed through the filter body 20 to another member, such as a pipe string, connected to the inner support member 10 for transporting the filtrate outside the well. Usually, the inner support member 10 is a hollow, tubular member and has perforations, pores, or other openings in its peripheral wall which permit fluid to flow into the hollow center of the inner support member 10, but the inner support member 10 need not be hollow as long as it is capable of transporting filtrate. For example, it may be a solid, porous member through which filtrate can flow axially, or it may be a solid member having axial channels in its outer surface for the transport of fluid. For reasons of strength, it is usually cylindrical, but other shapes may be employed, such as a shape with a polygonal or oval cross section, and the cross section may vary along its length. A typical example of the inner support member 10 is a cylindrical pipe having a uniform circular cross section over most of its length and having perforations 11 for filtrate formed over a portion of its length in a region on which the filter body 20 is mounted. The inner support member 10 may be equipped with connecting portions at one or both of its ends to enable the inner support member 10 to be connected to other members. In FIG. 1, the inner support member 10 has an externally threaded pin 12 formed at each lengthwise end which can be screwed into an internally threaded box of a pipe or into a standard pipe connector for joining the pins of two pipes. When the filter is intended to be connected in series with a string of production pipe, a perforated production pipe is particularly suitable as the inner support member 10, since the threaded connectors of the production pipe will have the same strength as that of the connectors of the pipe string to which the filter is to be connected. If the inner support member 10 is expected to be subjected to only low tensile, torsional, or radial compressive forces, light-weight lockseam tubing or polymeric tubing may be employed for the inner support member 10. If the filter body 20 is sufficiently strong, it may be possible to omit the inner support member 10, but when the filter is used in a well for oil or gas, an inner support member 10 will usually be desirable in light of the very high compressive forces which may be encountered in such wells. If the filter is to be installed at the tail end of a pipe string or other conduit, the lower end of the inner support member 10 may be closed off with a bull plug or similar member.

The inner support member 10 can be made of any material capable of withstanding the conditions to which the inner support member 10 is to be subjected during installation and use. When the inner support member 10 is formed from a length of production pipe (commonly referred to as a pipe joint), it will typically be made of steel.

The length of the inner support member 10 is not critical, and one or more filter bodies 20 can be mounted on a single inner support member 10. Members other than a filter body 20 can also be mounted on the inner support member 10, such as collars or conventional centralizers for guiding the filter as it is inserted into a well bore.

The filter body 20 contains a filter medium which in the present embodiment is used to filter a well fluid to form a filtrate, although the filter medium may be used for other fluid treatment purposes, such as for coalescing or formation of air bubbles (sparging). The filter body 20 may have any structure capable of performing the intended removal of substances from the fluid being filtered or other type of fluid treatment and may employ any desired type of filter medium, such as meshes, membranes, perforated sheets or plates, wire wrap, sintered unitary bodies, or resin-consolidated bodies such as porous bodies comprising particles coated and held together by a binder. The filter medium will usually be one which is capable of resisting a tensile stress, as opposed to a filter medium comprising loose particles packed into an annular space. When the filter medium is formed from a sheet-like material, it will frequently be wrapped around the inner support member 10 (such as helically, spirally, or cylindrically) to form one or more concentric layers, but it may be arranged in other configurations, such as in the form of pleats. The filter medium may be made of any suitable materials, including but not being limited to metals and polymers. When the filter is to be used in a well for oil or gas, a porous metal medium, such as a sintered metal medium is frequently suitable, and a particularly suitable filter medium for such environments is a sintered metal supported porous filter medium comprising metal particulates (such as powders, particles, fibers, and mixtures thereof) sintered to a foraminate support member, such as those manufactured by Pall Corporation and sold under the trademarks PMM and PMFII. A supported porous medium provides a filter having excellent damage resistance, meaning that the filter substantially retains its filtering integrity even when significantly deformed. Various examples of filter bodies including a sintered metal supported porous medium are described in U.S. Pat. No. 5,664, 628 and may be employed in the present invention. However, because a filter body 20 of a filter according to the present invention can be prevented from excessive elongation, porous metal filter media other than supported porous media, such as unsupported powder metal or fiber metal media, can also be employed.

The filter body 20 need not have any particular shape. Usually, it will have an inner periphery which is similar in shape to the outer periphery of the inner support member 10, and its outer periphery will usually be rounded (such as cylindrical) to make it easier for the filter body 20 to pass through well casing.

In addition to some type of filter medium, the filter body 20 may include a variety of other components, such as drainage layers to assist the flow of fluid into the filter medium and the flow of filtrate into the inner support member 10, cushioning layers to prevent abrasion of the filter medium, diffusion layers placed between layers of filter medium to permit edgewise flow of fluid, and layers for selectively blocking flow through portions of the filter body 20. The structure and use of these and other components of a filter body 20 are well known to those skilled in the art.

Drainage layers can be made of any materials having low resistance to edgewise flow. Various types of meshes are frequently suitable for use as drainage layers, but in applications requiring particular strength, sturdier materials such as expanded metal sheets can instead be employed.

The filter body 20 is typically connected to the inner support member 10 in a manner preventing fluid from bypassing the filter body 20 by flowing between the filter body 20 and the inner support member 10 and resisting movement of the filter body 20 in the lengthwise direction of the inner support member 10 in response to axial forces. For example, the filter may include end connectors 30, such as end rings, connected to the lengthwise ends of the filter body 20 and sealed to the inner support member 10. The end connectors 30 may be rigidly secured to the inner support member 10, or one or both of the end connectors 30 may be capable of movement in the lengthwise direction of the inner support member 10. Examples of various types of end connectors which can be used in the present invention include but are not limited to those described in U.S. Pat. No. 5,664,628 and in U.S. patent application Ser. No. 08/848,490 filed on May 8, 1997, and U.S. patent application Ser. No. 08/878,529 filed on Jun. 19, 1997, both of which are incorporated by reference. Depending upon the materials of which the inner support member 10 and the filter body 20 are made, it may be possible to directly connect the filter body 20 to the inner support member 10 by welding, for example, without the use of end connectors 30.

FIG. 2 illustrates the structure of a portion of the filter body 20 and one of the end connectors 30 in this embodiment. The filter body 20 is supported on an inner support member 10 in the form of a standard carbon steel API pipe perforated with holes 11 on a staggered spacing. Two stainless steel annular end connectors 30 (316L stainless steel) having a plurality of steps 31 formed thereon are slipped over the ends of the inner support member 10 and welded to it. A layer of square weave wire mesh of 316L stainless steel is cylindrically wrapped around the inner support member 10 and resistance welded to the end connectors 30 and along a longitudinal seam to form an inner drainage layer 21. A plurality of filter layers 22 (two layers in the illustration) of a 316L stainless steel sintered supported porous metal medium are then wrapped around the inner drainage layer 21. Each filter layer 22 is individually wrapped and welded to itself and to the end connectors 30 to obtain a longitudinal seam without the layers 22 being joined to each other or to the inner drainage layer 21 between their lengthwise ends, thereby allowing the filter layers 22 to shift during deformation of the filter. The longitudinal seams of adjoining filter layers 22 are preferably staggered in the circumferential direction of the filter. An unillustrated copper chill strip measuring approximately 0.010 inches thick, for example, may be placed between each layer 22 and any adjoining member during welding to prevent the layer 22 from being secured to the adjoining member. A layer of 316L stainless steel square weave mesh is then wrapped around the filter layers 22 as an outer drainage layer 23 and welded to the end connectors 30 and to itself to form a longitudinal seam.

The cage 40 surrounding the filter body 20 can serve a variety of functions. One function which it performs in the present embodiment is that of a restraining member which restrains the filter body 20 against radial expansion due to radially outward forces acting on the filter body 20 so as to limit the elongation (expressed as strain) of the filter body 20 during the radial expansion to at most its maximum allowable elongation, wherein the maximum allowable elongation of the filter body is the highest elongation at which the filter body 20 can still remove particles of a given size with a desired efficiency. More preferably, the restraining member limits the elongation of the filter body 20 to less than the maximum allowable elongation by a safety factor. Another function which the cage 40 may perform is to protect the filter body 20 against erosion, abrasion, and impacts, either during installation or operation of the filter underground. The cage 40 may also contribute to the strength and rigidity of the filter. The cage 40 will typically be immobilized to prevent its lengthwise movement with respect to the filter body 20, such as by being welded or otherwise secured to each of the end connectors 30. The cage 40 is typically made of a material which is impervious to the fluid being filtered, such as steel, and is formed with perforations 41, such as holes, slits, or other openings of any desired shape, through which fluid to be filtered can flow to reach the filter body 20. However, it is also possible to form the cage 40 of a porous material which is permeable to the fluid being filtered.

A filter body may be damaged by excessive radial expansion in various locations and in various ways. In some cases, the filter medium itself may be damaged, developing cracks, tears, or stretched areas where the size of the pores or openings in the filter medium is greatly increased compared to their size in an intact state. In other cases, the filter medium itself may be undamaged, but seams where the filter medium is joined to itself or joints between the filter medium and another member may be damaged, producing a pathway for unfiltered particles to bypass the filter medium. These different modes of damage may occur at quite different amounts of elongation, so the maximum allowable elongation may be different for different regions of a filter body. Therefore, the cage 40 preferably ensures that no region of the filter body 20 exceeds its maximum allowable elongation.

The maximum allowable elongation of a filter body can be determined both theoretically and experimentally. In those cases in which the strength of the filter medium itself is the determining factor, the maximum allowable elongation can be readily measured by means of a tensile test. In such a test, a permanent strain is applied to a filter medium to be tested using conventional tensile test equipment, the filter medium is removed from the test equipment after the application of the strain, a fluid is then passed through the filter medium, and the ability of the filter medium to remove particles of a given size from the fluid is measured. The maximum strain at which the filter medium can still remove particles of a given size with a desired efficiency is the maximum allowable elongation for the filter medium for the given particle size. The maximum allowable elongation of a seam or a joint can be measured in a similar manner. Many filter medium are able to undergo at least some plastic deformation while retaining significant filtering integrity, so the maximum allowable elongation will frequently be in the range of plastic elongation of the filter medium.

In order for the cage 40 or other restraining member to be able to limit the elongation of the filter body 20 during radial expansion to at most its maximum allowable elongation, the size of any gap between the outer periphery of the filter body 20 and the inner periphery of the restraining member is preferably sufficiently small that the filter body 20 can expand outwards against the restraining member to fill the gap around the entire periphery of the filter body 20 without the elongation of the filter body 20 exceeding its maximum allowable elongation. More preferably, the elongation of the filter body 20 as it expands against the restraining member is less than the maximum allowable elongation by a safety factor. For example, it may be at most 90% of its maximum allowable elongation. The direction of elongation of the filter body 20 as its expands against the restraining member will depend upon the direction of the stresses acting on the filter body 20 during expansion. Over much of the length of the filter body 20, radial expansion will result primarily in hoop stresses in the filter body 20, with axial or shear stresses being of much less significance. In these regions, the elongation of the filter body 20 will be substantially equal to the circumferential elongation. Near the lengthwise ends of the filter body 20 where it is secured to the end connectors 30, radial expansion may result in significant axial or shear stresses, and the filter body 20 may elongate in more than one direction, so in these regions, the elongation of the filter body 20 may be higher than its circumferential elongation. The elongation of various regions of the filter body 20 can be readily calculated based on the geometry of the filter body 20. For example, in those regions wherein the elongation is equal to the circumferential elongation, the elongation is given by the formula $$\text{elongation} = (C_{rr}/C_{fb}) - 1$$

wherein
$C_{rr}$ = inner circumference of the restraining member in a relaxed state
$C_{fb}$ = outer circumference of the filter body in a relaxed state If the filter body 20 and the restraining member are very close to cylindrical, $C_{rr}$ and $C_{fb}$ in the above formula can be replaced by the inner diameter of the restraining member and the outer diameter of the filter body 20, respectively, in a relaxed state.

The cage 40 or other restraining member is also preferably sufficiently stiff in tension that it can limit the total radial expansion of the filter body 20 (the radial expansion of the filter body 20 as it expands to fill any gap between the filter body 20 and the restraining member, plus any further radial expansion of the filter body together with the restraining member after the filter body 20 has filled any gap between the two) which will not result in the filter body 20 exceeding its maximum allowable elongation. Preferably, the restraining member is able to withstand a differential pressure of approximately 200 psi, more preferably of approximately 1000 psi, and still more preferably of approximately 2000 psi greater on the interior than the exterior of the filter without the filter body 20 exceeding its maximum allowable elongation. The restraining member will typically have a much higher modulus of elasticity than the filter body 20 and the amount of radial expansion of the filter body 20 after it contacts the inner surface of the restraining member will usually not be of concern in those pressure ranges that the restraining member is intended to resist.

In the present embodiment, the cage 40 is formed separately from the filter body 20 and is slipped axially over an end of the inner support member 10 until it surrounds the filter body 20. Such a cage 40 can be formed by a variety of methods. The illustrated cage is a spiral welded tube, but other types of cylindrical members formed separately from the filter body 20, such a seamless member or a rolled member with a longitudinal seam may also be used. In order to make it easier to install a previously-formed cage 40 around the filter body 20, the cage 40 in a relaxed state typically has an inner diameter which is larger than the outer diameter of the filter body 20 and the end connectors 30 in a relaxed state. When the cage 40 is initially installed around the filter body 20, the difference in diameter between the filter body 20 and the cage 40 may be too large to prevent the filter body 20 from exceeding its maximum allowable elongation if the filter body 20 expands against the cage 40 during operation of the filter. Therefore, in the present embodiment, after the cage 40 is disposed around the filter body 20, the cage 40 is plastically deformed radially inwardly to reduce the inner diameter of the cage 40 to a value such that the filter body 20 can expand against the cage 40 without exceeding its maximum allowable elongation, and preferably such that the elongation of the filter body 20 when it contacts the cage 40 is less than its maximum allowable elongation by a safety factor.

The regions of the cage 40 which are radially compressed to produce plastically deformation may be uniformly compressed by the same amount, or different regions may be compressed by different amounts, and some regions may be left uncompressed. For example, if the regions of the filter body 20 having the lowest maximum allowable elongation are the lengthwise ends, the portions of the cage 40 spaced from the ends may be compressed less than the portions surrounding the ends. The cage 40 may be compressed uniformly around its circumference, or different portions of the circumference may be compressed by different amounts. For example, if the filter body 20 has a standing seam, i.e., a seam which is formed by crimping or folding over of material rather than by a permanent connecting method such as welding and which relies on friction to prevent it from coming apart, it may be sufficient to radially compress the cage 40 atop the seam to keep the seam in compression, without other regions being compressed. More commonly, however, the inner diameter of the cage 40 will be uniformly reduced around its circumference.

Figure 3:
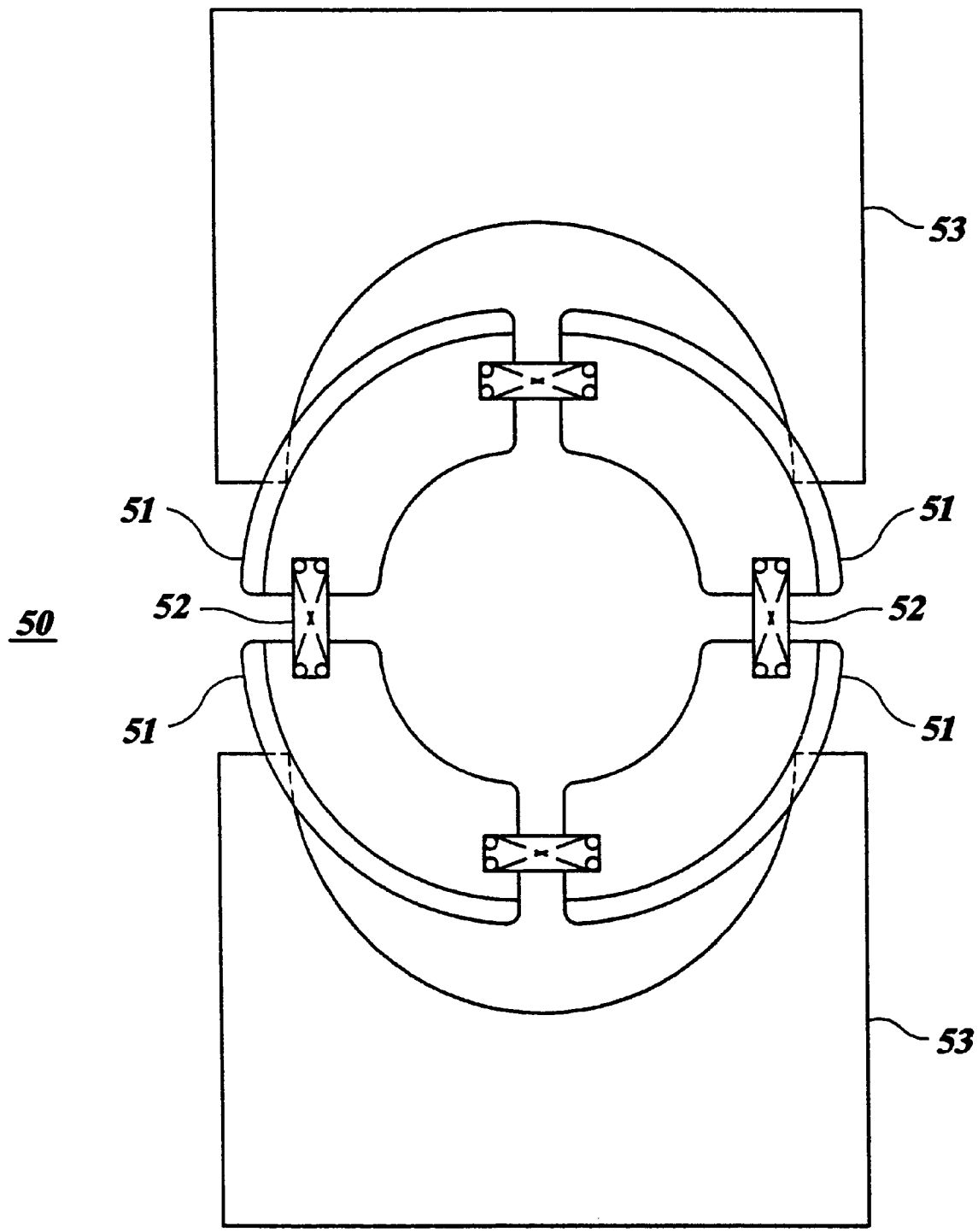
FIG. 3 is an end view of a swaging die in an open state for use in compressing the cage of the embodiment of FIG. 1.
Figure 4:
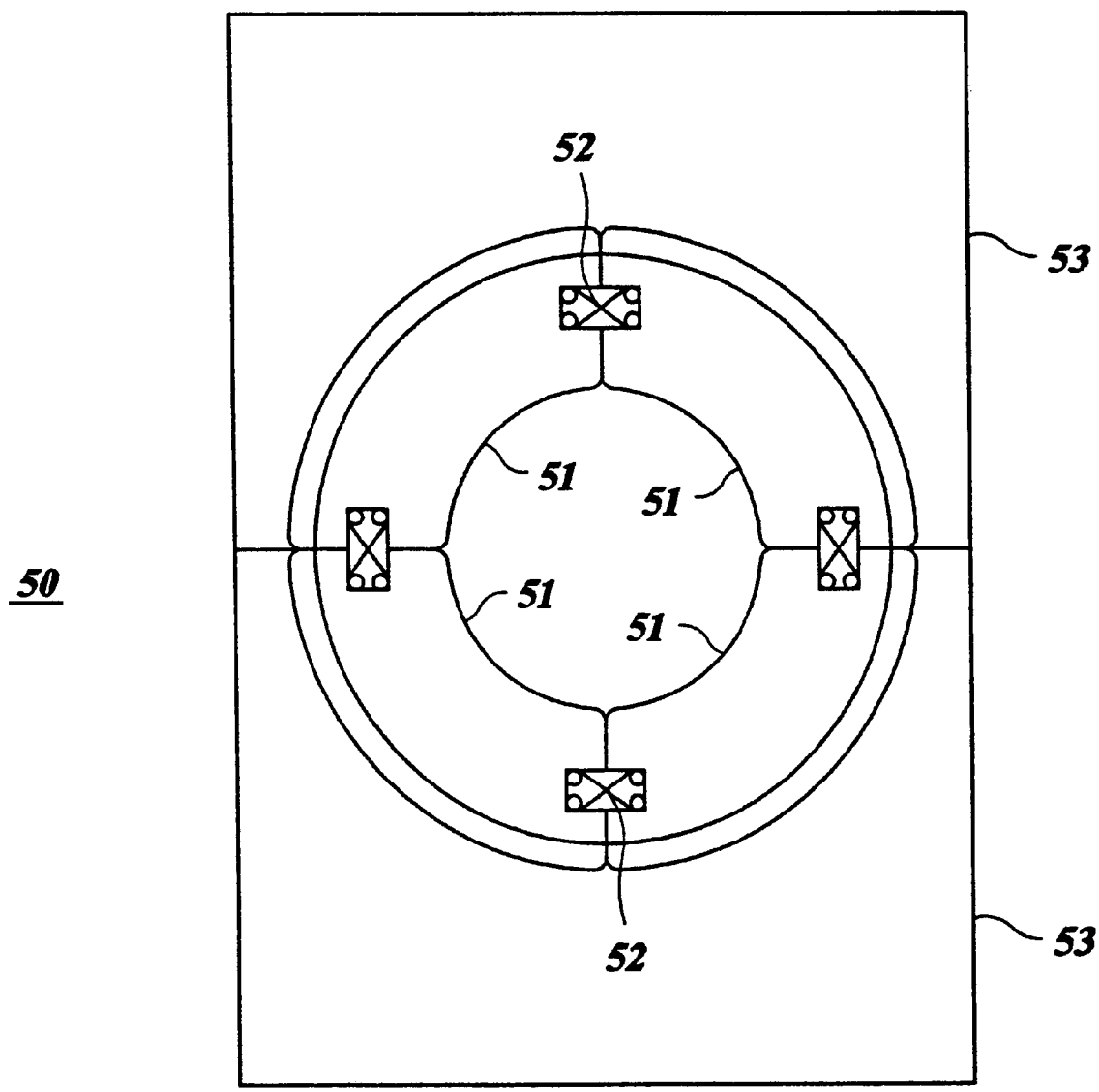
FIG. 4 is an end view of the swaging die of FIG. 3 in a closed state.

The cage 40 may be reduced in diameter in any desired manner. FIGS. 3 and 4 are schematic elevations of an example of a device 50 which can be used to radially compress the cage 40 of the embodiment of FIG. 1 to plastically deform the cage 40 and reduce a gap between the inner periphery of the cage 40 and the outer periphery of the filter body 20. The illustrated device 50 is essentially a conventional swaging mechanism having a plurality of die sections 51 (such as four die sections) disposed between a pair of retainers 53. Each die section 51 has an inner periphery which is an arc of a circle as viewed in elevation and an outer periphery which is an arc of a larger circle concentric with the inner periphery. The die sections 51 can be moved with respect to each other between an expanded state shown in FIG. 3 and a contracted state shown in FIG. 4 in which the die sections 51 are closer to each other than in the expanded state and the inner peripheries lie on a common circle. The die sections 51 are biased away from each other toward their expanded state by compression springs 52 disposed between adjoining sections. The die sections 51 are moved from their expanded state to their contracted state by the two retainers 53, each of which, as viewed in elevation, has a semicircular inner periphery having a radius of curvature corresponding to the radius of curvature of the outer periphery of each of the die sections 51. One or both of the retainers 53 is movable towards and away from the other retainer 53 so that the retainers 53 can be moved between an open state shown in FIG. 3 in which the die sections 51 can assume their expanded state and a closed position shown in FIG. 4 in which the die sections 51 are forced by the retainers 53 to their contracted state. The retainers 53 may be moved between their open and closed states by a hydraulic press or any other suitable mechanism able to exert a sufficient compressive force on the retainers 53. When the retainers 53 are in their open state, the die sections 51 automatically move to their expanded state under the force of the springs 52. The die sections 51 are preferably replaceable so that the amount of compression which is applied to a cage 40 can be varied by exchanging one set of die sections 41 with another set having inner peripheries with a different radius of curvature.

The cage 40 of the filter can be radially compressed by inserting the filter into the opening between the die sections 51 and then applying a compressive force to the retainers 53 to simultaneously force all the die sections 51 against the outer periphery of the cage 40 and plastically deform the cage 40 radially inwards. When the radial inward force applied to the cage 40 by the die sections 51 is released by retracting the retainers 53, there will generally be some spring-back of the cage 40 in the radially outward direction. Therefore, the amount of compression of the cage 40 produced by the die sections 51, which is determined by the size of the die sections 51, is selected so as to obtain a desired gap between the filter body 20 and the cage 40 after spring-back. If it is desired that the inner periphery of the cage 40 contact the outer periphery of the filter body 20 with no gap between them after spring-back has taken place and the filter body 20 is capable of being radially compressed without damage, the cage 40 can be compressed by the die sections 51 until the cage 40 compresses the filter body 20. If the filter body 20 is of a type which might be damaged by radial compression, the cage 40 may be compressed so that it does not contact or only lightly contacts the filter body 20 during compression of the cage 40. In this case, a gap will usually remain between the cage 40 and the filter body 20 after spring-back. Depending upon the amount of compression, the inner diameter of the cage 40 in the compression region may end up being smaller than the maximum outer diameter of the end connectors 30.

For ease of manufacture, the perforations 41 in the cage 40 will usually have a circular shape as formed. During compression of the cage 40, the plastic deformation of the cage 40 may cause many of the perforations 41 to be deformed into ovals or slits elongated in the lengthwise direction of the cage 40.

As an example of compression of a filter like that shown in FIG. 1 using the device of FIGS. 3 and 4, a spiral-welded cage 40 of 304L stainless steel with an initial outer diameter of 3.45 inches and a wall thickness of 0.075 inches was compressed to reduce the difference between the outer diameter of a filter body 20 surrounded by the cage 40 and the inner diameter of the cage 40 from an initial value of approximately 0.116 inches to approximately 0.022 inches after spring-back.

If the die sections 51 are sufficiently long, the entire length of the cage 40 which it is desired to compress may be compressed at one time. If the die sections 51 are shorter than the cage 40, the cage 40 may be compressed one section at a time until the desired length of the cage 40 has been compressed. Preferably, the cage 40 is compressed over the entire lengthwise region where it surrounds portions of the filter body 20 which are subject to radial expansion and which need restraint against excessive elongation, such as over the entire length of the filter body. Preferably, the portions of the cage 40 which are compressed include the regions surrounding the lengthwise ends of the filter body 20 where the filter body 20 is welded to the end connectors 30, since high shear stresses can develop in the filter medium in the vicinity of the welds if the filter body 20 is not restrained against radial expansion at its lengthwise ends. However, it may be preferable not to compress the extreme lengthwise ends of the cage 40 to avoid damaging the welds between the ends and the end connectors 30. Therefore, in the present embodiment, there is a step 42 in the cage 40 between the regions of the cage 40 which were compressed and the ends which were not compressed, as shown in FIG. 2, and the inner diameter of the cage 40 increases towards its lengthwise ends, being larger outboards of the step 42 than inboards of it.

A device for use in compressing the cage 40 is not restricted to the swaging device 50 illustrated in FIGS. 3 and 4, and any other device capable of exerting a suitable radially inward force on the cage 40 may be employed. For example, it may be possible to compress the cage 40 by hydrostatic compression or by moving a wire drawing die of suitable diameter down the length of the cage 40.

If the lengthwise ends of the cage 40 are not restrained, the cage 40 will tend to undergo significant linear expansion during radial compression, making it difficult to subsequently secure the ends of the cage 40 to the end connectors 30. Therefore, the cage 40 is preferably secured to the end connectors 30 or otherwise immobilized against elongation prior to the start of radial compression.

Figure 5:
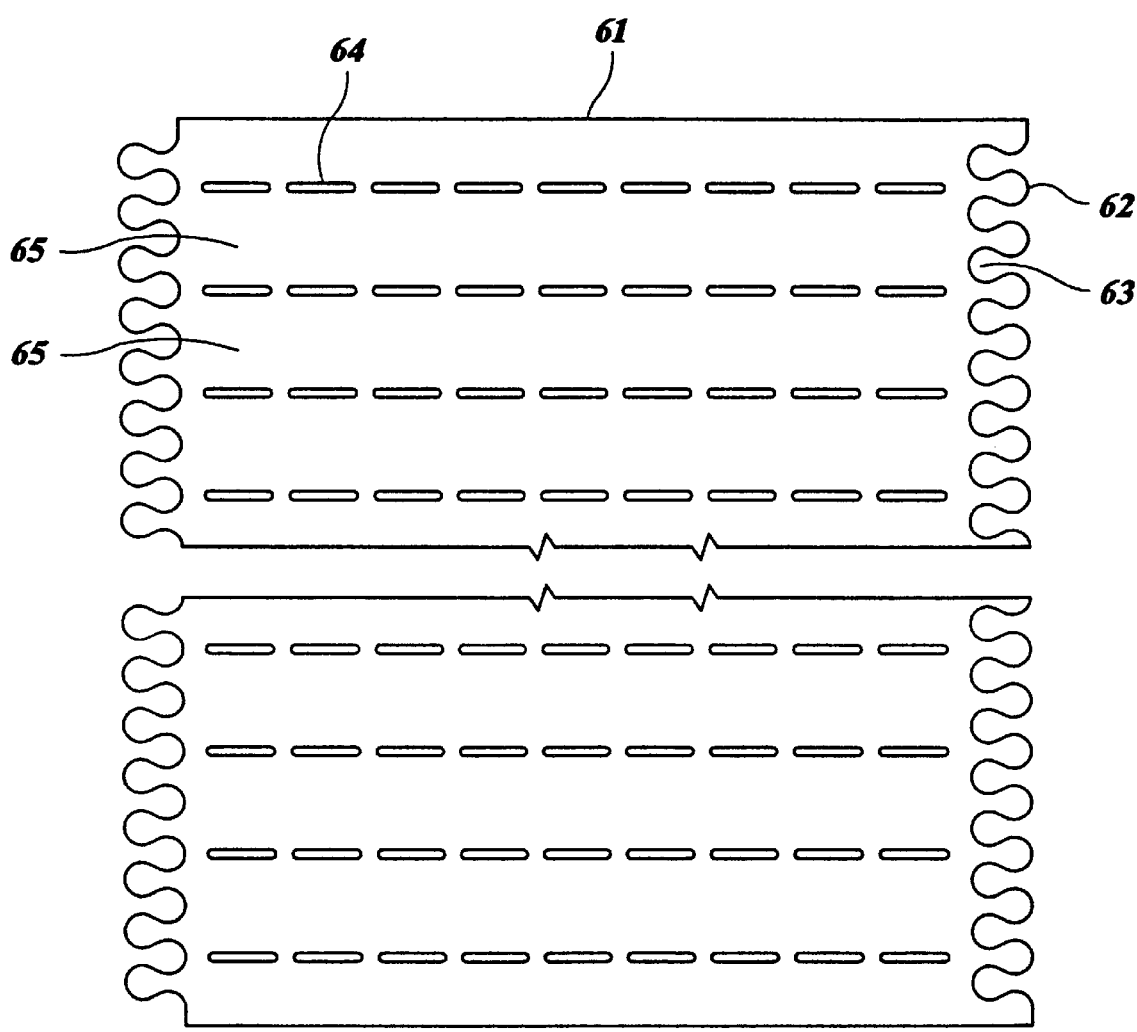
FIG. 5 is a plan view of a blank for use in forming a split cage having interlinked portions.
Figure 6:
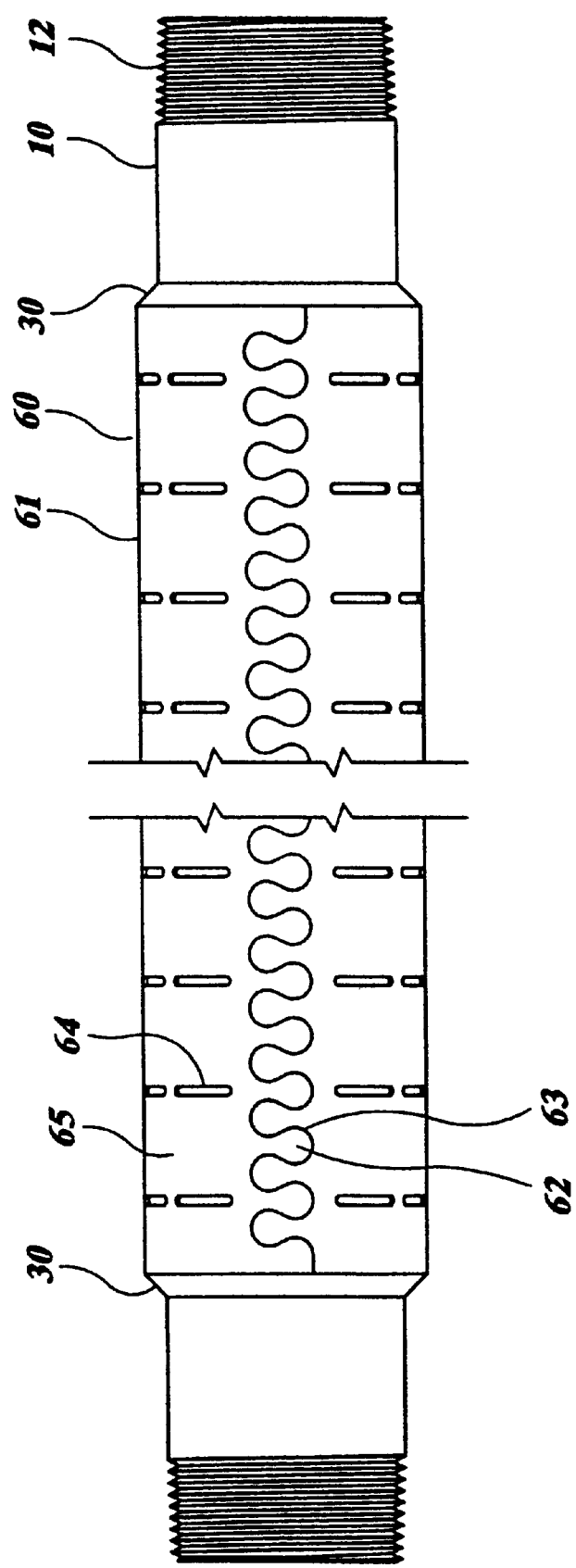
FIG. 6 is an elevation of a filter equipped with a split cage formed from the blank of FIG. 5.

FIGS. 5 and 6 illustrate another example of a restraining member in the form of a split cage 60 which can be employed in the present invention. The split cage 60 is formed from a flat blank 61, shown in FIG. 5, which is deformed around a filter body 20 into a cylindrical shape as shown in elevation in FIG. 6, and the adjoining ends of the blank 61 are secured to each other to maintain the blank 61 in the shape of a cylinder. The adjoining ends of the blank 61 can be secured to each other in any desired manner. In the present embodiment, each end is formed with alternating lobes 62 and recesses 63 complementary in shape to the lobes 62. Each lobe 62 can fit into one of the recesses 63 in the adjoining end of the blank 61 so that the adjoining ends are interlinked. The lobes 62 and recesses 63 can engage each other with any desired degree of tightness, ranging from a loose fit to a press fit. The lobes 62 and recesses 63 are rounded in this embodiment to reduce stress concentrations when loads are applied to the cage 60 during its use, but other shapes (such as dovetailed shapes) may also be used. When the lobes 62 and recesses 63 are engaged with each other so as to be interlinked, they can resist significant forces in the circumferential direction of the cage 60 to prevent the adjoining ends of the blank 61 from separating from each other. To further increase the strength of the cage 60, the adjoining ends of the blank 61 may be secured to each other in additional ways. For example, a longitudinal weld may be formed on the outer surface of the cage 60 along the lobes 62 and recesses 63, or a punch may be driven into each lobe 62 to cause the lobe 62 to plastically deform over the adjoining recesses 63 to resist radial forces tending to produce disengagement of the lobes 62 and recesses 63. After the cage 60 is formed around the filter body 20, the lengthwise ends of the cage 60 may be secured to the end connectors 30, if desired, by welding or other suitable method. The dimensions of the blank 61 are preferably selected so that when the blank 61 is formed around the filter body 20 and the adjoining ends of the blank 61 are secured to each other, any radial gap between the inner periphery of the cage 60 and the outer periphery of the filter body 20, if present, is small enough to prevent damage to the filter body 20, i.e., to prevent the filter body 20 from exceeding its maximum allowable elongation if it expands against the inner periphery of the cage 60, without it being necessary to compress the cage 60 to reduce the size of the gap, as is done in the preceding embodiment. In this embodiment, there is no spring-back of the cage 60 after the adjoining ends of the blank 61 are secured to each other, so it is easy to form the cage 60 around the filter body 20 such that its entire inner periphery is in contact with the outer periphery of the filter body 20, i.e., such that there is no gap between them, without it being necessary to radially compress the filter body 20 during the process of installing the cage 60 around the filter body 20. However, it is also possible for the inner periphery of the cage 60 to be pressed tightly against the outer periphery of the filter body 20. Thus, the cage 60 may fit around the filter body 20 with any desired degree of tightness.

Having a cage or other restraining member radially compressing the filter body 20 when there are no external radial forces acting on the filter is often desirable because it reduces both the frequency and magnitude of stress cycles which can result in the filter body 20 undergoing fatigue over time. If the restraining member can exert a radially inward pressure on the filter body equal to the highest radially outward differential pressure which the filter body 20 is expected to experience, the filter body 20 can be prevented from ever being subjected to hoop stresses.

Like the cage 40 of the filter shown in FIG. 1, the cage 60 of this embodiment includes a plurality of perforations 64 which enable a fluid to be filtered to pass easily through the cage 60 and reach the filter body 20. The hoop strength of the cage 60 can be increased if the perforations 64 are arranged so that the cage 60 includes uninterrupted bands of material, i.e., bands of material not containing any perforations 64 extending in the circumferential direction of the cage 60 around its entire periphery. Accordingly, in the present embodiment, the perforations 64 are arranged in circumferentially extending rows separated by solid bands of material 65 also extending in the circumferential direction of the cage 60. The perforations 64 may have any desired shape. For example, they may be circular as shown in FIG. 1, or they may be elongated in the circumferential direction of the cage 60 to define slits. For a given total area of the perforations 64 in the cage 60, the width of the bands of material 65 between adjoining rows of perforations 64 can be maximized by elongating the perforations 64 in this manner.

It is also possible to form the perforations 41 of the cage 40 of the embodiment of FIG. 1 into circumferentially extending rows separated by circumferentially extending solid bands of material. However, while the solid bands of material increase the hoop strength of a cage, they also increase its compressive strength and make the cage more difficult to radially compress as is done in the embodiment of FIG. 1 to decrease the size of the gap between the cage and the filter body. Therefore, the arrangement of the perforations in a cage may be selected by balancing the desired hoop strength in tension with the desired ease of compression.

Figure 7:
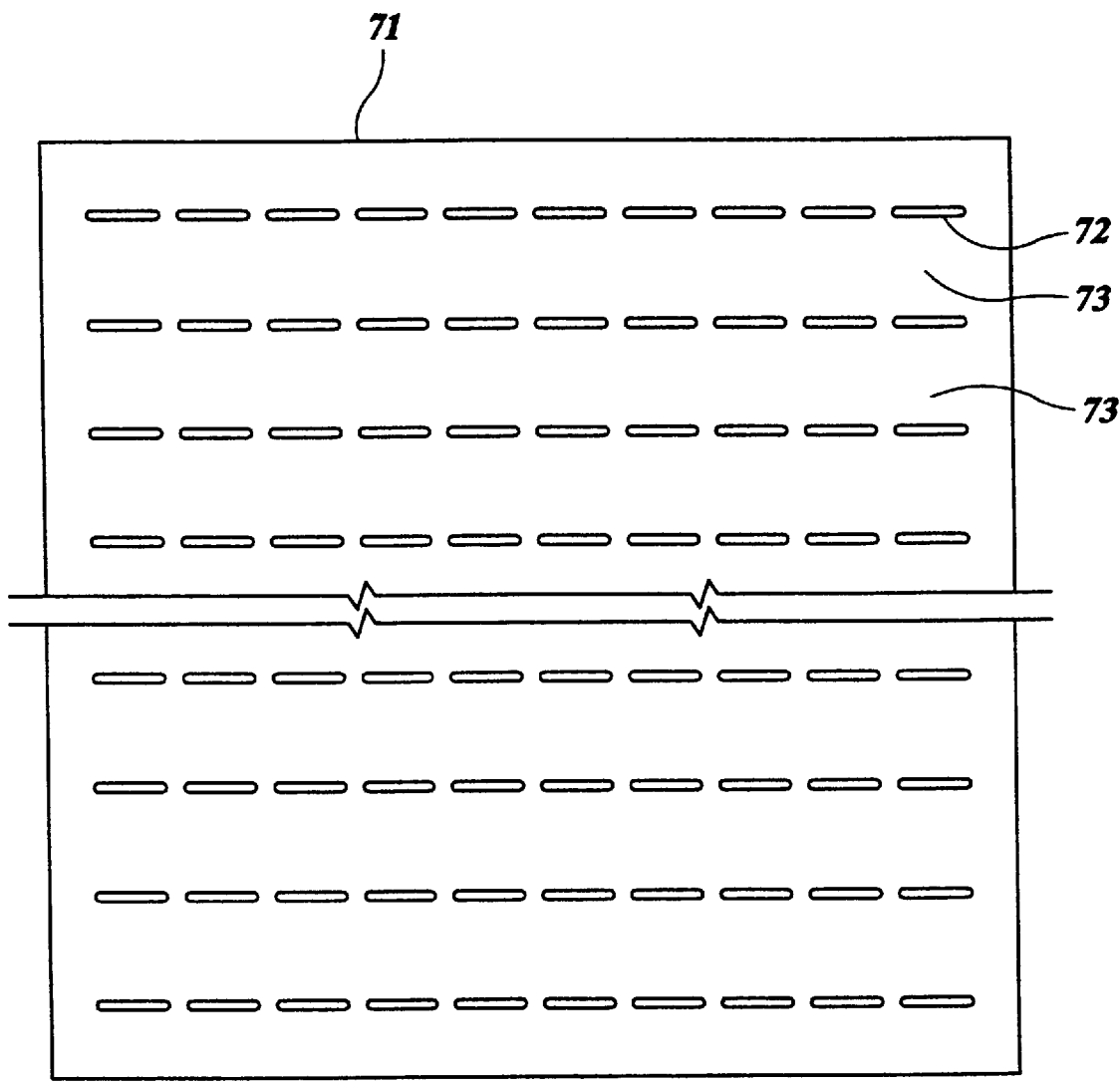
FIG. 7 is a plan view of a blank for use in forming another type of split cage.
Figure 8:
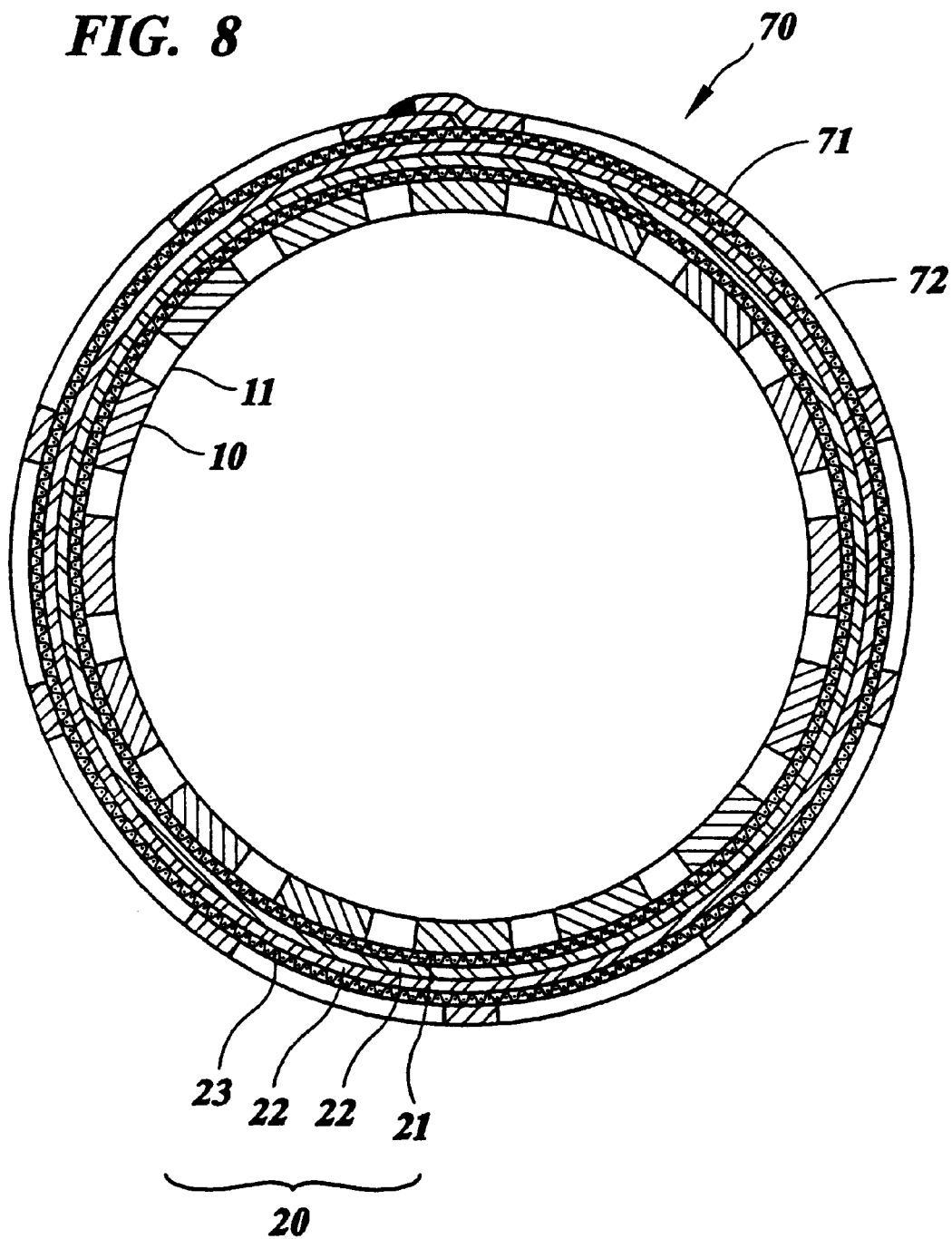
FIG. 8 is a transverse cross-sectional view of a filter equipped with a split cage formed from the blank of FIG. 7.

FIGS. 7 and 8 illustrate another example of a restraining member in the form of a cylindrical cage 70 which can be employed in the present invention. FIG. 7 is a plan view of a flat blank 71 for use in forming the cage 70, and FIG. 8 is a transverse cross-sectional view of the blank 71 after it has been formed into a cylindrical shape around a filter body 20 to define the cage 70. The blank 71 may be similar in structure to the blank 61 of the embodiment of FIGS. 5 and 6, but the widthwise ends of the blank 71 are not intended to mechanically engage with each other, so they may be without engaging portions. When the blank 71 is formed into the cage 70, the adjoining ends of the blank 71 are overlapped in the circumferential direction of the filter body 20 and then secured to each other by a lengthwise seam weld or other suitable joining method. The lengthwise ends of the cage 70 may then be welded or otherwise secured to the end connectors 30 of the filter, if desired. This embodiment is advantageous because it is easy to obtain a desired tightness of fit between the inner periphery of the cage 40 and the outer periphery of the filter body 20 by simply varying the amount of overlap of the adjoining ends of the blank 71. For example, the cage 70 may be made to tightly fit around the filter body 20 and exert a radially compressive force on it, the cage 70 may lightly contact the outer periphery of the filter body 20 without significantly compressing it, or there may be a radial gap between the outer periphery of the filter body 20 and the inner periphery of the cage 70. As in the preceding embodiments, a gap, if present, is preferably sufficient small that the filter body 20 can expand against the inner periphery of the cage 70 without exceeding its maximum allowable elongation.

Figure 9:
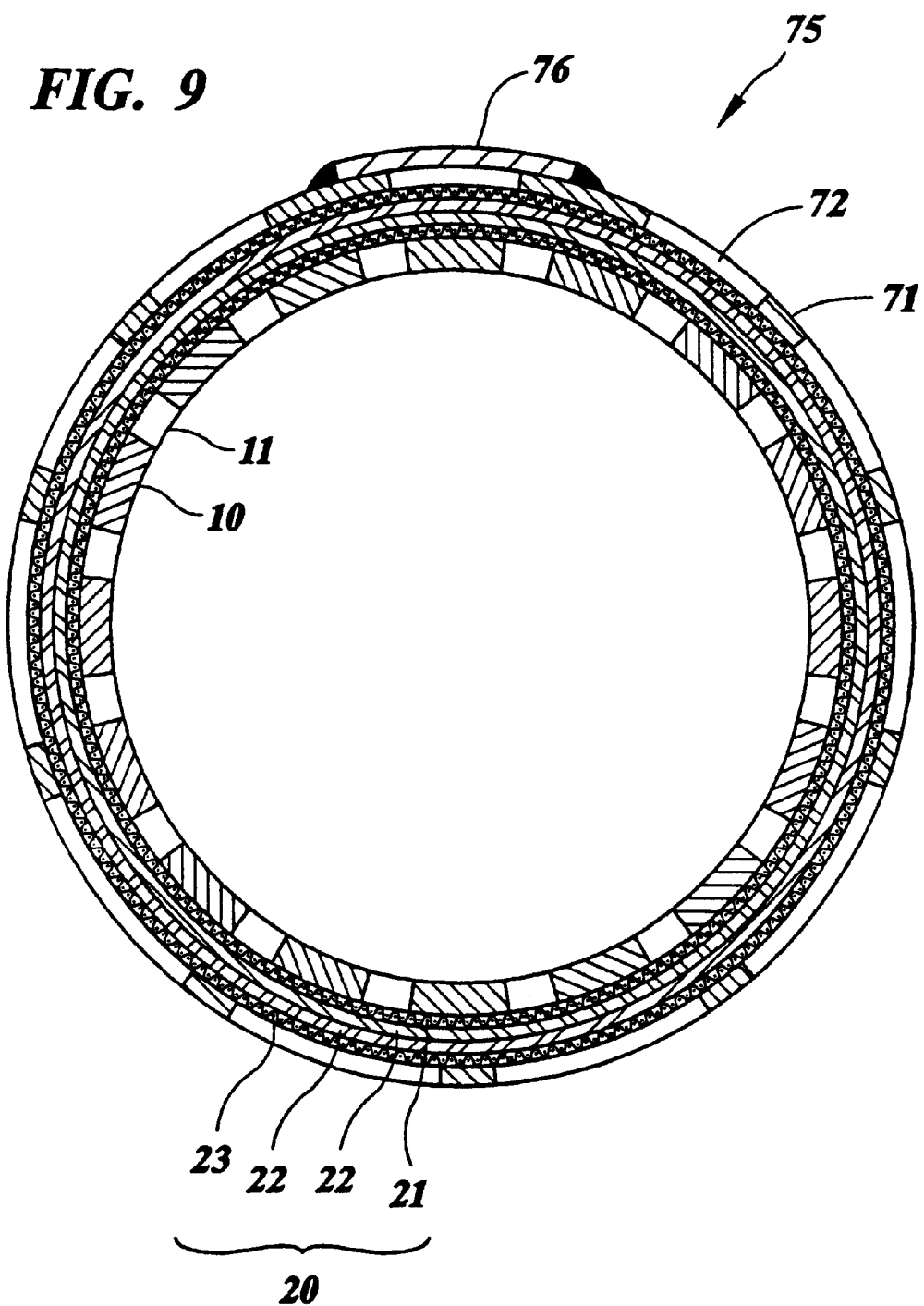
FIG. 9 is a transverse cross-sectional view of a filter equipped with another type of split cage.

FIG. 9 is a transverse cross-sectional view of another embodiment of a restraining member which can be used in the present invention. In this embodiment, the restraining member is in the form of a cage 75 formed from a perforated blank 71 having dimensions such that when the blank 71 is deformed around a filter body 20, the two ends of the blank 71 are spaced from each other. The ends of the blank 71 are then immobilized by spanning the gap between them with a strip 76 of material and then securing the strip 76 to both ends of the blank 71 in a suitable manner depending upon the material of which the blank 71 and the strip 76 are made, such as by a seam weld extending in the lengthwise direction of the filter body 20. Depending on the size of the gap between the ends, a filler strip may be disposed in the gap to support the portion of the filter body 20 surrounded by the gap against radially outward forces. The strip 76 is shown as overlapping both ends of the blank 71 in the circumferential direction, but alternatively the strip 76 may be disposed in the gap between the ends of the blank 71.

Another form of restraining member which can be used in the present invention is a wrap member wrapped helically around a filter body 20 in a plurality of turns over the regions of the filter body 20 which it is desired to radially restrain. A wrap member can have any configuration giving it sufficient strength in tension to restrict elongation of the filter body 20 when the filter is subjected to a radially outward pressure to at most its maximum allowable elongation. For example, the wrap member may comprise wire, wire rope, sheet metal, webbing, mesh, plate, bar stock, or a variety of other members, with or without an overlap between adjoining turns of the wrap member. It may be made of any material having sufficient strength and durability to be used in a well environment.

Figure 10:
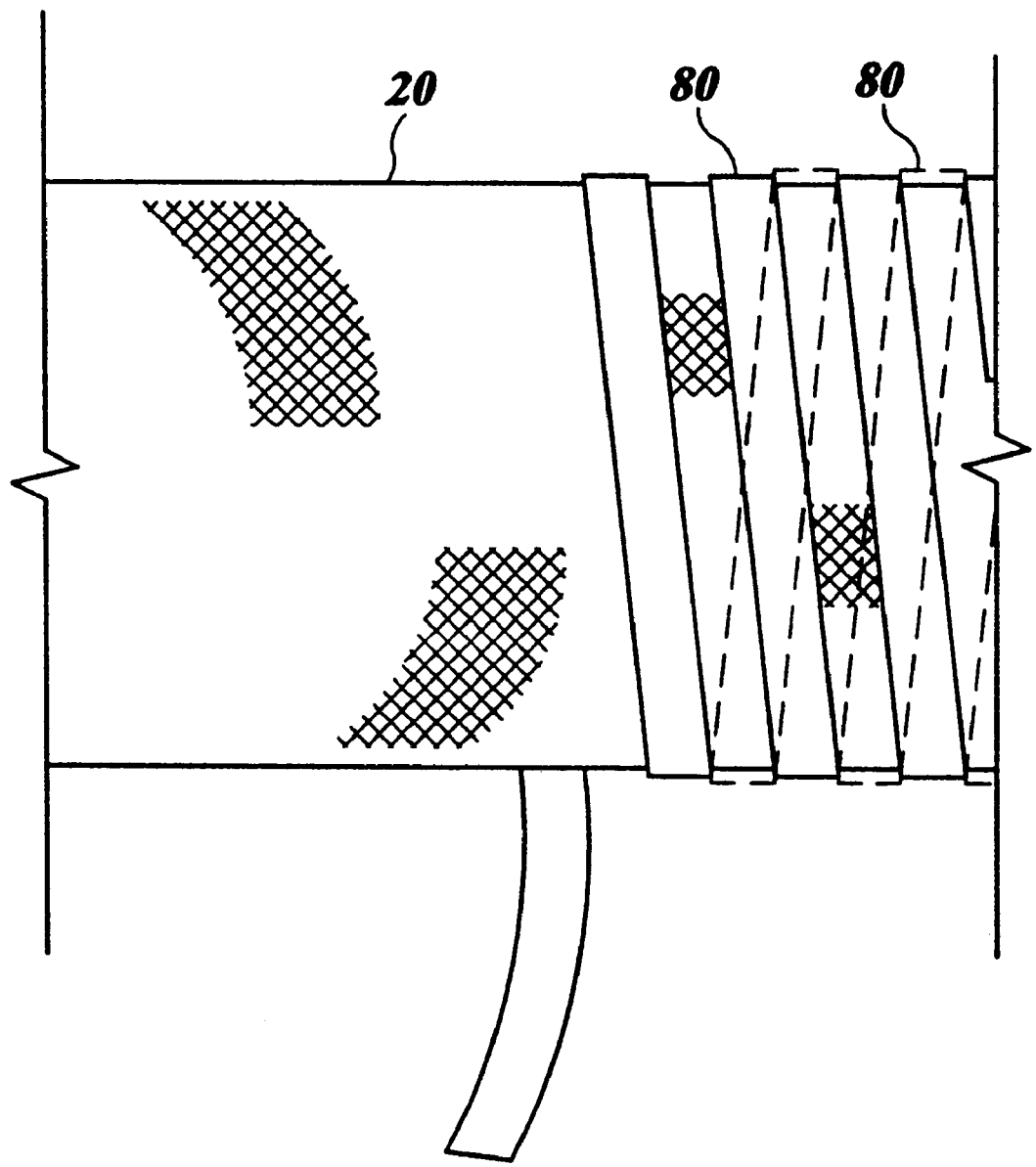
FIG. 10 is a plan view of a filter body being helically wrapped with a wrap member.
Figure 11:
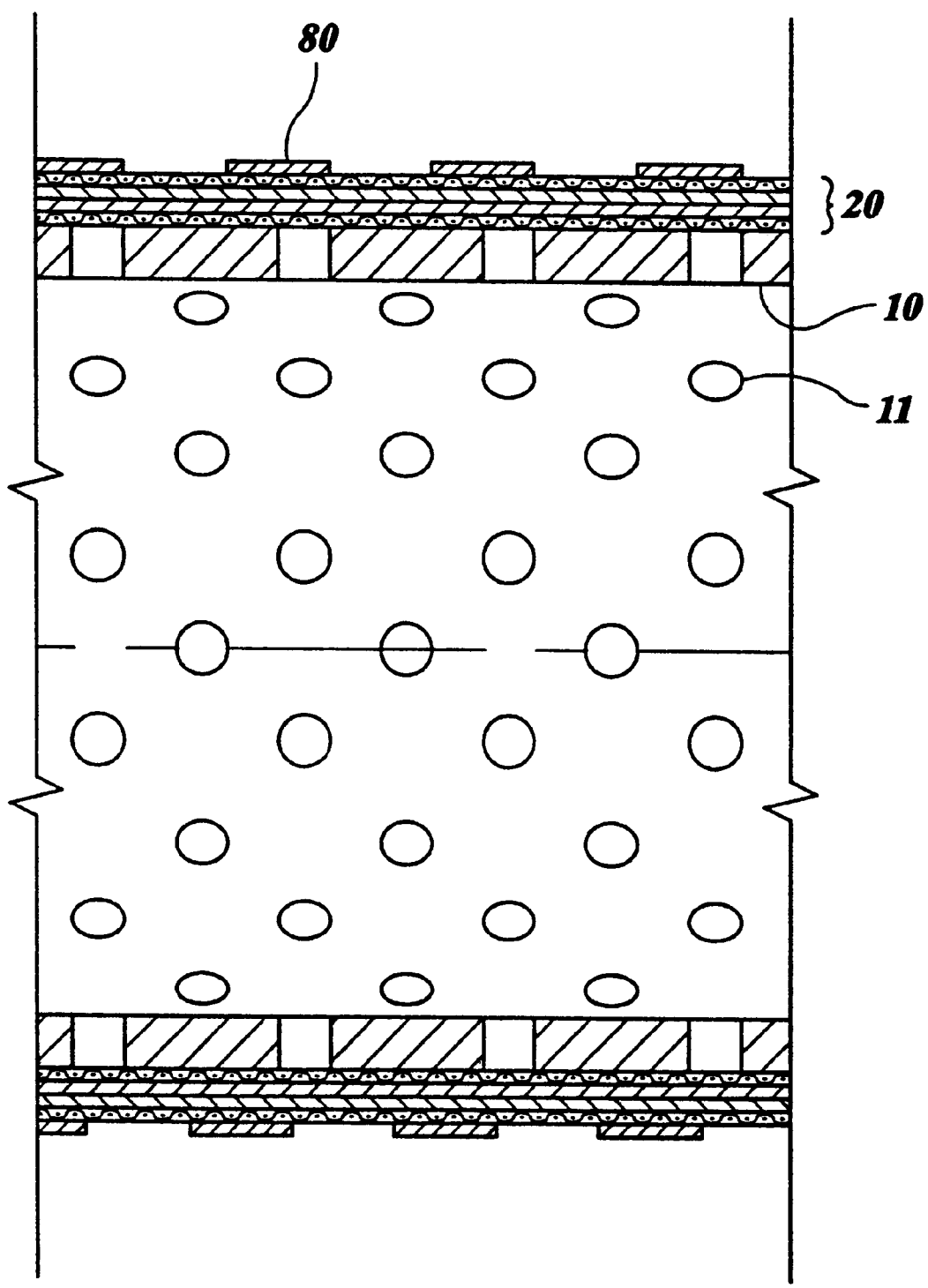
FIG. 11 is a longitudinal cross-sectional view of a portion of the filter body of FIG. 10.

FIGS. 10 and 11 illustrate an embodiment having a wrap member 80 in the form of a thin metal strip helically wrapped around a filter body 20 in a plurality of turns, with a gap between adjoining turns of the wrap member 80. FIG. 10 is a plan view schematically illustrating the wrap member 80 being wrapped around the filter body 20, and FIG. 11 is a longitudinal cross-sectional view of a portion of the wrap member 80 and the filter body 20. The illustrated filter body 20 has the same structure as the filter body 20 shown in FIG. 2, but any other type of filter body may also be employed. The wrap member 80 may be secured to the filter body 20 by welding or other method at one or more locations along the length of the wrap member 80, but it may be advantageous if only the ends of the wrap member 80 are immobilized, with the remainder of the wrap member 80 unrestrained against movement in the axial or circumferential directions except by friction so that the wrap member 80 and the filter body 20 can slide with respect to each other in response to applied forces without tearing of the filter body 20. For example, in the present embodiment each end of the wrap member 80 is welded to an unillustrated end connector 30 at one of the lengthwise ends of the filter body 20.

The wrap member 80 is not intended to perform an removal of particles from the fluid being filtered, so the gap between adjacent turns of the wrap member 80 will typically be larger than the diameter of particles in the fluid being filtered. At the same time, the gaps are preferably sufficiently small that unsupported regions of the filter body 20 between adjoining turns of the wrap member 80 will not be damaged by radially outward fluid forces. Typical wire wrap used in conventional well filters has a gap between adjoin wires on the order of 0.005 to 0.012 inches. In contrast, the gaps between adjoining turns of the wrap member will generally measure at least about 0.015 inches, such as about 0.020 to about 0.030 inches, and may be up to 0.250 inches or larger. The present embodiment includes a single wrap member 80 disposed around the filter body 20, but alternatively a plurality of wrap members may be helically disposed around the same region of the filter body 20 in parallel like the threads of a multiple-thread screw.

The wrap member 80 may form a single layer around the filter body 20, or as shown by dashed lines in FIG. 10, the wrap member 80 may wrapped so as to form a plurality of concentric layers, with each layer be wrapped in the opposite direction from the layer which it surrounds, i.e., so that the layers cross each other when the filter is viewed in plan. A plurality of layers may be formed by a single wrap member 80, i.e., by a single strip of material, or different layers may be formed by separate wrap members, i.e., by separate strips of material. Arranging the wrap member(s) 80 in a plurality of layers can increase the strength of the wrap member(s) in tension while permitting a decrease in the transverse cross-section of each wrap member.

A wrap member can be disposed around a filter body with any desired degree of tightness, ranging from a loose fit to a tight fit. Although it is possible for there to be a radial gap between the outer surface of the filter body and the inner surface of the wrap member, it may be difficult to control the size of such a gap, so it is generally preferable for the wrap member to be wrapped so that it lies in contact with the outer surface of the filter body around its entire periphery and more preferably so that the wrap member is compressed against the filter body, for the same reasons that compression of the filter body by a cage can be advantageous.

Figure 12:
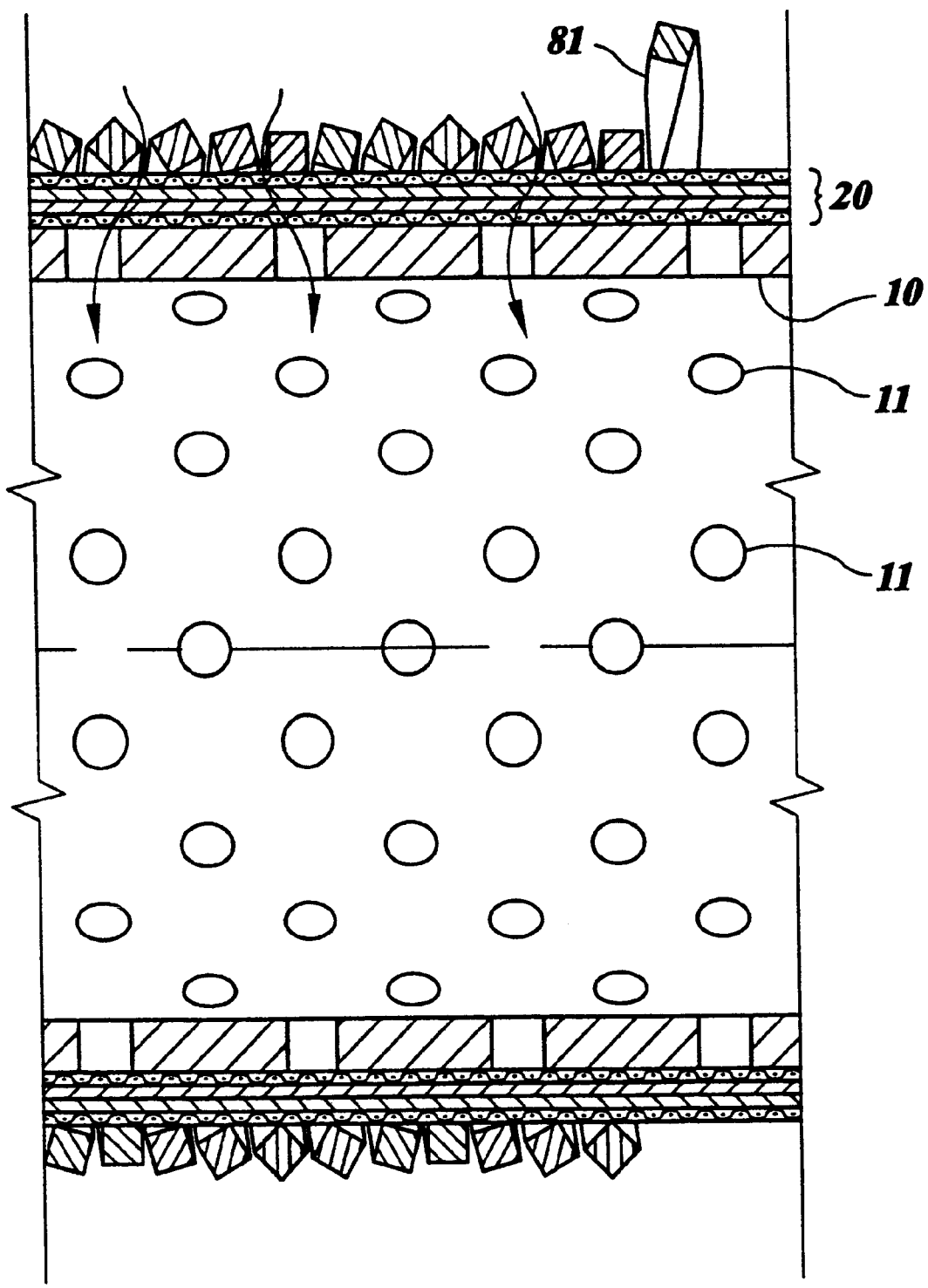
FIG. 12 is a longitudinal cross-sectional view of a filter being helically wrapped with another type of wrap member.

FIG. 12 is a longitudinal cross-sectional view of a filter body 20 equipped with another example of a wrap member 81 which can be used as a restraining member in the present invention. This wrap member 81 comprises an elongated member of non-circular transverse cross-section which is twisted about its longitudinal access into a helical shape before being helically wrapped around the filter body 20. The illustrated wrap member 81 is formed of bar stock with a rectangular cross section, but many other cross-sectional shapes can be employed, such as triangular or other polygonal cross sections, or elliptical or other non-circular curved cross sections. When a member with such a cross section is twisted about its longitudinal axis, one or more helical channels are formed around the periphery of the member. The helically twisted shape of the wrap member 81 may be one produced by elastic deformation which reverts to an untwisted shape when a restraining force on the wrap member 81 is released, but the wrap member 81 is easier to dispose around the filter body 20 if its twisted shape is a permanent one produced by plastic deformation, for example. A helically twisted shape can be easily formed by restraining one end of a piece of bar stock with a vise and then twisting the other end of the bar stock about its axis using a drill, a lathe, or other rotating member. Such a wrap member 81 can be wrapped around a filter body 20 with a very small gap or even with no gap between adjoining turns of the wrap member 81, since the helically-twisted shape permits adjoining turns to contact each other only intermittently and leaves spaces between noncontacting portions of adjoining turns through which fluid can flow to reach the filter body 20. As a result, a greater portion of the filter body 20 can be restrained than is possible with the wrap member shown in FIGS. 10 and 11. The size of the helical spaces between noncontacting portions of adjoining turns of the wrap member 81 is preferably such that the wrap member 81 performs substantially no removal of particles from the fluid being filter. Preferably, the spaces between noncontacting portion of adjoining turns of the wrap member 81 permit particles measuring at least about 0.015 inches in diameter to pass through the spaces. The wrap member 81 can be prevented from becoming unwrapped in the same manner as the wrap member 81 of the embodiment of FIGS. 10 and 11, such as by being welded to end connectors 30 at the lengthwise ends of the filter body 20. Like the wrap member 80 of FIG. 10, wrap member 81 may comprise a single layer, or it may comprise a plurality of concentric layers wrapped around the filter body 20 in opposite directions.

A wrap member may be the outermost component of a filter, or a protective member such as a perforated cage may be disposed around the wrap member. In wells for oil and gas, the presence of a cage around a wrap member is frequently desirable, since a cage will generally have a smoother outer surface than will the wrap member and will make it easier to install the filter in a well without the filter catching on the interior of the well. The cage may be secured to the filter in any suitable manner, such as by being welded to end connectors 30 at the lengthwise ends of the filter body 20, as shown in FIG. 2. Preferably the wrap member alone is sufficiently strong to limit the elongation of the filter body 20 to at most its maximum allowable elongation under a differential pressure of approximately 200 psi, more preferably of approximately 1000 psi, and still more preferably of approximately 2000 psi greater on the interior than the exterior of the filter, so there may be a gap of any desired size between the outer periphery of the wrap member and the cage, and it is not necessary for the cage to closely surround the wrap member. However, if desired, the cage may be structured in the manner of any one of the embodiments of FIGS. 1–9 to produce a smaller gap between the filter body 20 and the cage.

Figure 13:
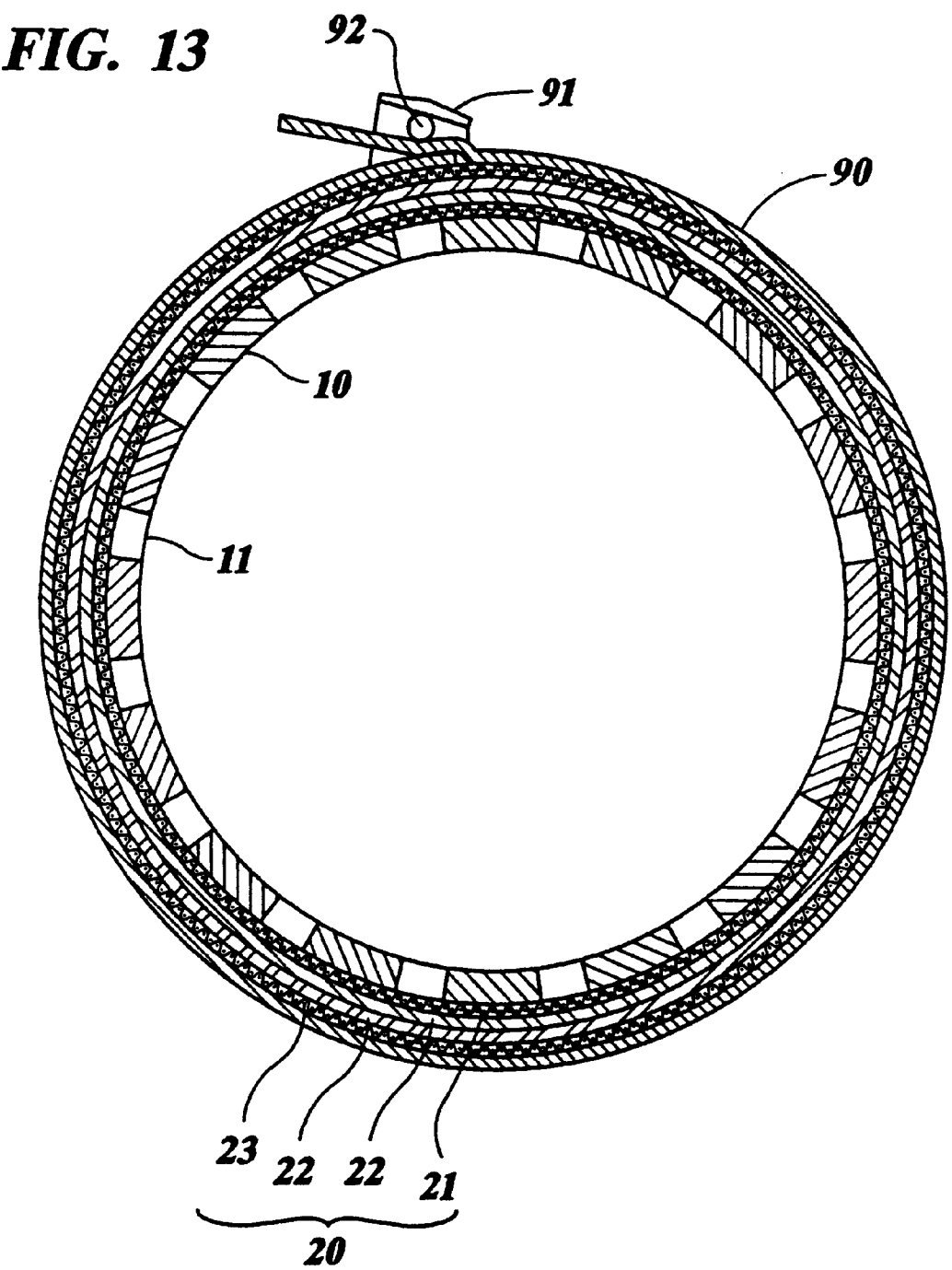
FIG. 13 is a transverse cross-sectional view of a portion of a filter according to the present invention equipped with a tie wrap.

Another example of restraining members which can be used to restrain a filter body against excessive elongation are rings, bands, clamps, or similar members disposed around the filter body at intervals along its length. FIG. 13 is a transverse cross-sectional view of a portion of a filter body 20 which is restrained by a plurality of restraining members in the form of conventional tie wraps 90 of steel or other high strength material. Each tie wrap 90 is equipped with a locking mechanism 91 through which one end of the tie wrap 90 passes. The locking mechanism 91 includes a locking ball 92 which permits the tie wrap 90 to be tightened around the filter body 20 but prevents the tie wrap 90 from coming loose. The gap between adjacent tie wraps 90 in the axial direction of the filter body 20 is large enough that the tie wraps 90 do not perform any substantial removal of particles in the fluid being filtered, but small enough that the unsupported regions of the filter body 20 between adjoining tie wraps 90 will not be damaged by radially outward fluid forces. Tie wraps 90 are a convenient way of restraining the filter body 20 because they do not require welding for their installation and can be easily mounted on the filter body 20 by hand. The tie wraps 90 may be the outermost components of the filter, or they may be surrounded by a cage or other protective member, as described above with respect to wrap members. The tie wraps 90 may be disposed around the filter body with any degree of tightness. In order to prevent the tie wraps 90 from moving in the axial direction of the filter body 20 in response to external forces, it is generally preferable for the tie wraps 90 to fit at least snugly around the filter body 20, i.e., with the inner periphery of the tie wraps 90 contacting the outer periphery of the filter body 20 around the entire circumference of the filter body 20, and more preferably the tie wraps 90 radially compress the filter body 20 to reduce fatigue of the filter body 20 in response to repeated pressure fluctuations. If a tie wrap 90 fits loosely around the filter body 20, i.e., if the inner diameter of the tie wrap 90 is larger than the outer diameter of the filter body 20 in a relaxed state, the difference in diameter is preferably sufficiently small that the filter body 20 can expand against the inner periphery of the tie wrap 90 without the elongation of the filter body 20 exceeding its maximum allowable elongation.

Figure 14:
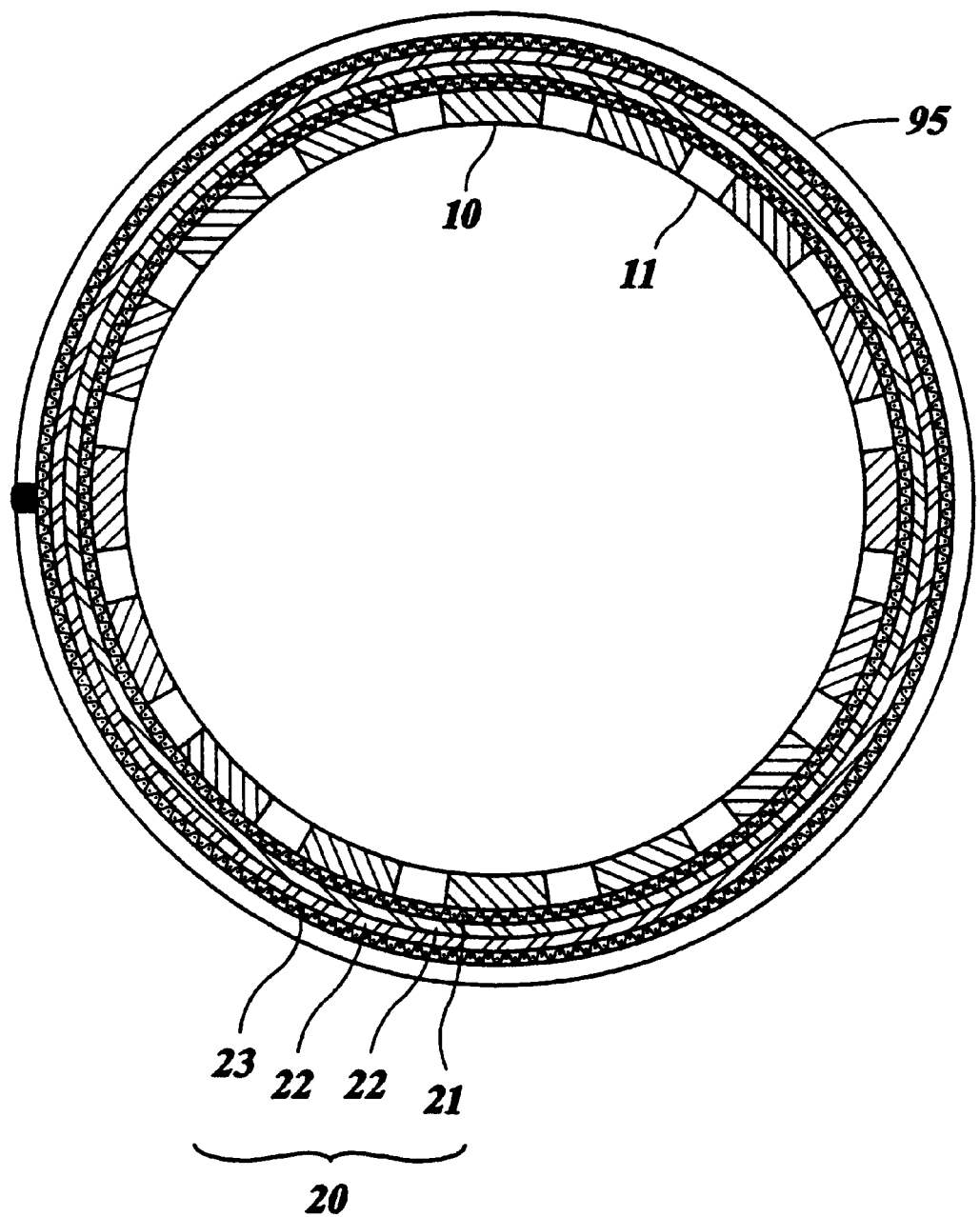
FIGS. 14–16 are transverse cross-sectional view of embodiments of a filter according to the present invention equipped with restraining members in the form of rings.
Figure 15:
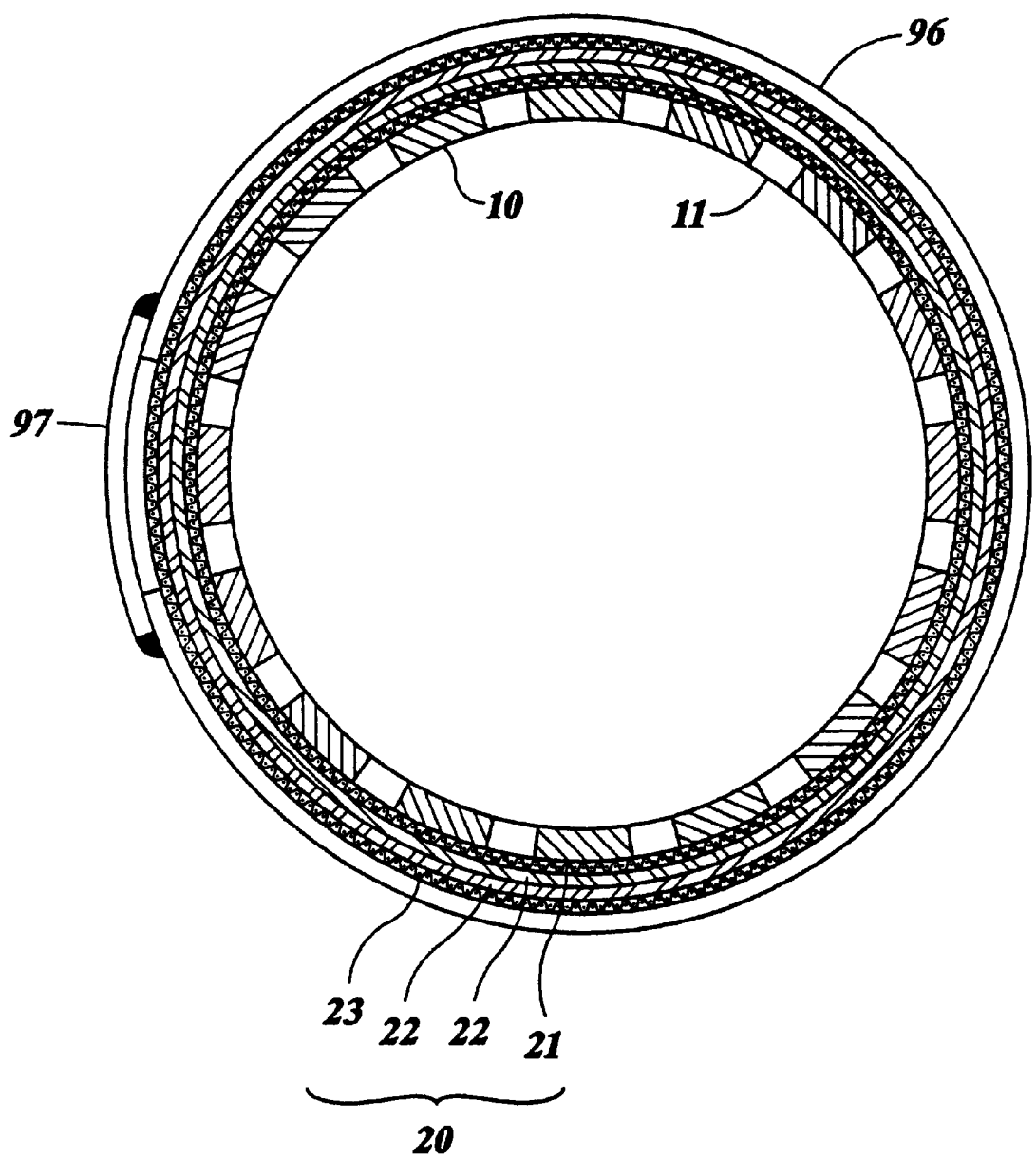
Figure 16:
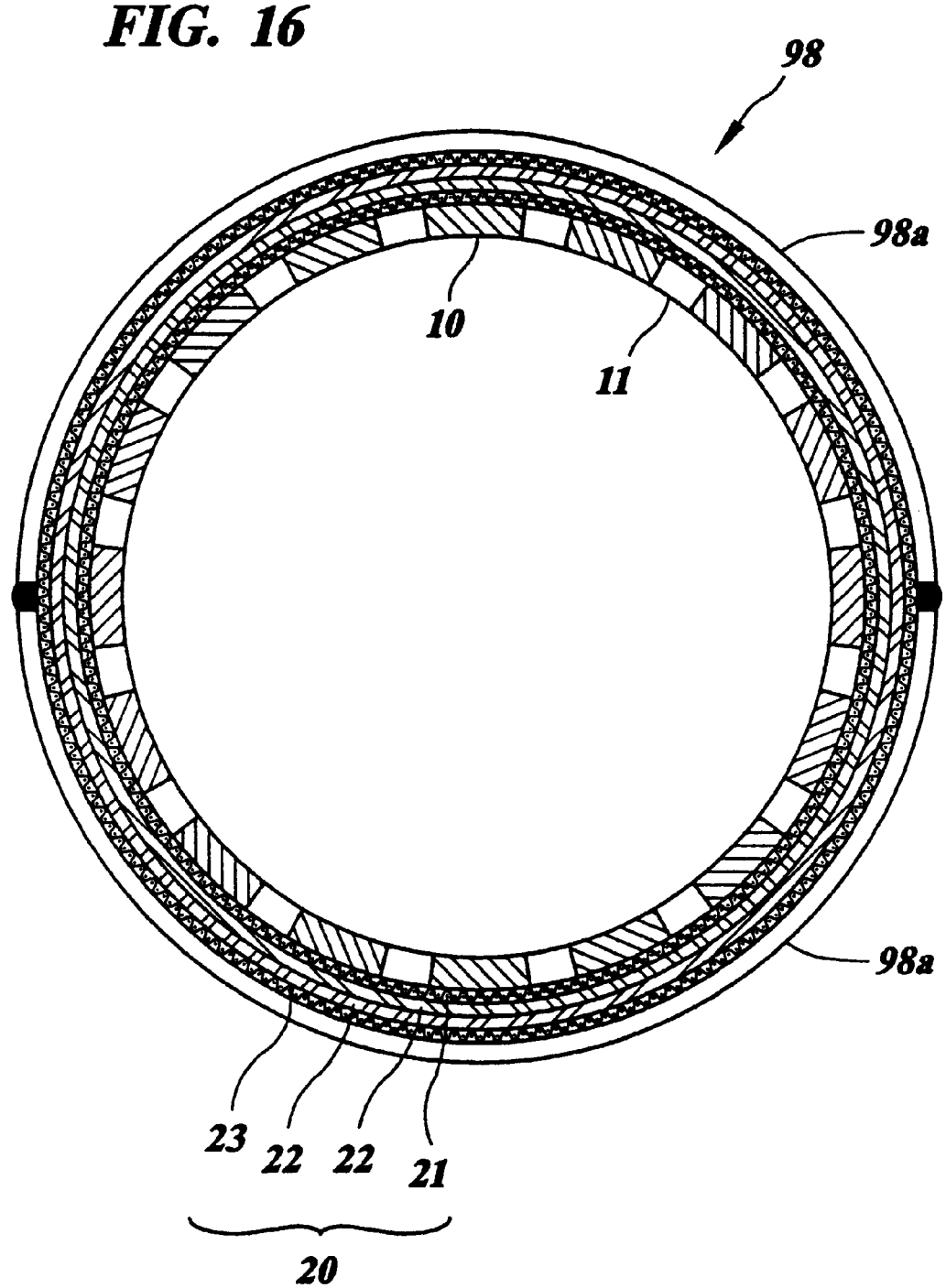

FIGS. 14–16 are schematic cross-sectional views of other examples of restraining members which can be used in a manner similar to the tie wrap 90 of FIG. 13. FIG. 14 illustrates a restraining member in the form of a split ring 95, i.e., a C-shaped ring which is secured around a filter body 20 with the adjoining ends of the ring 95 close enough to each other (such as abutting or overlapping) for the ends to be directly connected to each other by welding or other suitable method. The restraining member of FIG. 15 comprises a split ring 96 with a circumference such that when the ring 96 is disposed around a filter body 20, the ends of the ring 96 are spaced from each other by a distance such that they can not be directly welded to each other. Instead, the ends of the ring 96 are secured to each other by a strip of material 97 which spans the gap between the ends and is secured to the two ends by welding or other suitable method. FIG. 16 illustrates a restraining member in the form of a multi-piece ring 98 which is disposed around the filter body 20 with each end of each piece 98a of the ring 98 secured to an end of the other piece 98a in any suitable manner, such as by the methods used with the examples of FIGS. 14 or 15. While the restraining members of FIGS. 14–16 may be somewhat more complicated to install around a filter body 20 than a tie wrap, they generally do not require as much flexibility as a tie wrap, so they can be built to withstand greater radial forces than can a tie wrap. A single filter body 20 may employ any one of the types of restraining members shown in FIGS. 13–16, or a plurality of different types of these restraining members may be used in combination.

In some instances, it may be desirable for the restraining member to be capable of removing particles from the fluid being filtered. For example, when a filter according to the present invention is used in a gravel pack, the restraining member can be used to prevent the particles in the gravel pack from contacting the filter body and abrading the filter layers. Alternatively, the restraining member can serve as a prefilter for the filter layers, regardless of whether the filter is installed in a gravel pack. As yet another alternative, the restraining member can serve as the primary filtering member during ordinary operation of the filter, and the filter layers of the filter body can serve as backup for the restraining member in case the restraining member is damaged.

Figure 18:
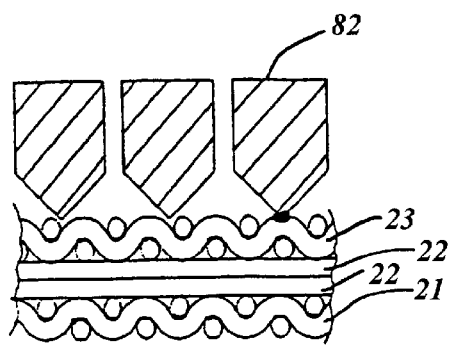
FIG. 18 is an enlarged cross-sectional view of a portion of the embodiment of FIG. 17.
Figure 17:
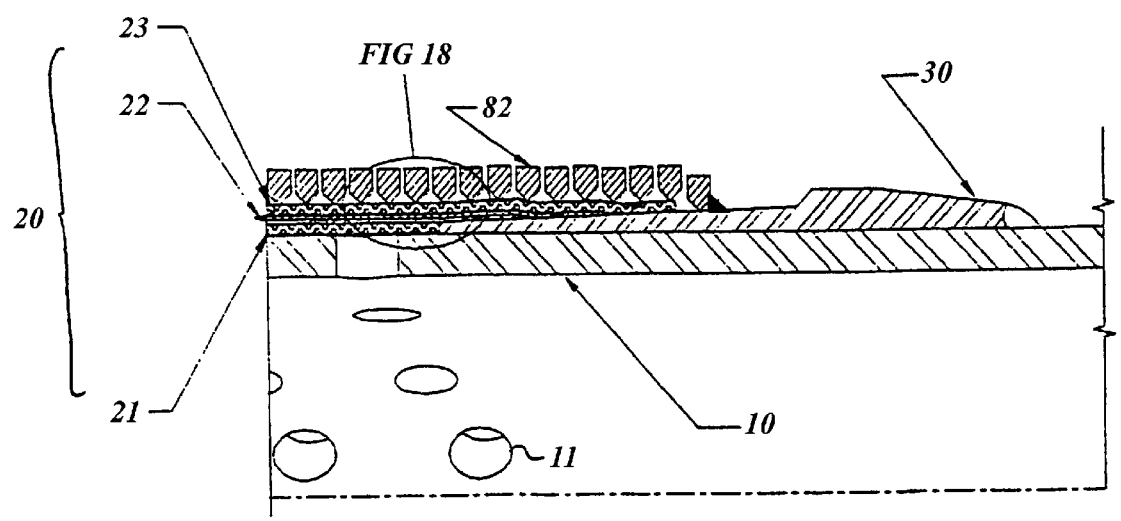
FIG. 17 is a longitudinal cross-sectional view of another embodiment of a filter according to the present invention equipped with a wrap member.

FIG. 17 is a longitudinal cross-sectional view of a portion of a filter according to the present invention equipped with a restraining member in the form of a wrap member 82 which is wrapped helically around a filter body 20 in a plurality of turns, and FIG. 18 is an enlarged view of a portion of FIG. 17. FIG. 17 shows only one lengthwise end of the filter body 20, but the other lengthwise end and the portions between the two ends may have a similar structure to that shown in FIG. 17. The filter body 20 is shown as having the same structure as the filter body 20 of FIG. 2, but it may have any other suitable structure enabling it to perform desired filtration. The wrap member 82 is capable of removing particles from the fluid being filtered while restraining the radially outward expansion of a filter body 20 surrounded by the wrap member 82 to a level which will not produce damage to the filter body 20. The illustrated wrap member 82 is formed using so-called "house-shaped wire" such as is conventionally used for wire wrapping of filters for subterranean wells, but any of the other shapes described above for use as wrap members can also be employed, or other shapes conventionally employed for wire wrap can be used, such as triangular or round wire. House-shaped wire, which has a pentagonal transverse cross-section with a flat outer surface, parallel sides perpendicular to the outer surface, and a wedge-shaped inner surface, is popular for use in wire wrap because it tends to have a higher resistance to erosion than other shapes, such as triangular wire.

The wrap member 82 can be disposed around the filter body 20 with any desired degree of tightness, ranging from a loose fit to a tight fit, but for the same reasons given for the wrap members of FIGS. 10–12, it is generally preferable for the wrap member 82 to be wrapped so that it lies in contact with the outer surface of the filter body 20 around the entire periphery of the filter body 20 and more preferably for the wrap member 82 to be wrapped under tension so that it is compressed against the filter body 20.

As is the case with the wrap members of FIGS. 10–12, the wrap member 82 may be secured to the filter body 20 by welding or other method at one or more locations along the length of the wrap member 82, or only the ends of the wrap member 82 may be immobilized, with the remainder of the wrap member 82 unrestrained against movement in the axial or circumferential directions except by friction. If the wrap member 82 is to perform filtration, in order to maintain a desired spacing between adjoining turns of the wrap member 82 when the wrap member 82 is subjected to stresses during operation of the filter, it may be desirable to immobilize the wrap member 82 continuously or at frequent intervals along its length, such as by welding the wrap member 82 to the filter body 10 at least once per turn and at least twice per turn of the wrap member 82. In general, the smaller the interval between welds measured along a helical path extending along the wrap member 82, the better the spacing between adjoining turns of the wrap member 82 can be maintained when the filter is subjected to stress. For example, the wrap member 82 may be welded to the filter body 10 wherever it contacts the filter body 10, at every other contact point, at every third contact point, etc. depending upon the desired strength. In FIGS. 17 and 18, the wrap member 82 is immobilized by welding to an end connector 30 at each lengthwise end of the filter body 20, and the radially inner portion of the house-shaped wire forming the wrap member 82 is welded to the outer drainage layer 23 of the filter body 20 by resistance welding, for example, wherever the wrap member 82 contacts one of the strands of the mesh of which the outer drainage layer 23 is comprised. The interval between adjoining welds measured along a helical path along the wrap member 82 in this case will thus depend upon the coarseness of the mesh forming the outer drainage layer 23 but will typically be at most approximately 0.5 inches and may be approximately 0.1 inches or smaller. When the outer drainage layer 23 is made from a different material, such as an expanded metal sheet, the welds may have a different spacing, depending upon the coarseness of the material.

The spacing between adjoining turns of the wrap member 82 will depend upon the size of the particles which it is desired for the wrap member 82 to be able to exclude. Generally, the spacing will be no larger than approximately 150% of the maximum nominal pore size of the filter layers 22 of the filter body 20. When the filter is used in wells for oil or gas, the nominal pore size of the filter layers 22 will frequently be in the range of approximately 25 to approximately 300 micrometers, so if the coarsest filter layer 22 in the filter body 20 had a nominal pore size of approximately 100 micrometers, the spacing between adjoining turns of the wire wrap 82 would generally be at most approximately 150 micrometers. There is no lower limit on the spacing between adjacent turns, and the spacing may be the same as or lower than the maximum nominal pore size of the filter layers 22.

The wrap member 22 of FIGS. 17 and 18 can be conveniently formed around the filter body 20 using conventional wire wrapping equipment. In forming conventional wire wrap, a plurality of parallel rods are temporarily secured to the exterior of a rotating mandrel with the rods extending in the lengthwise direction of the mandrel. A wire of suitable cross section is then wrapped helically around the rods and secured to the rods by resistance welding as the mandrel is rotated to form a tubular assembly of the lengthwise rods and the wire wrap. To form the wrap member 82 of FIGS. 17 and 18, the filter minus the wrap member 82 can be mounted on the mandrel of a wire wrapping machine in place of the rods, and wire of a desired cross-section can be helically wrapped under tension around and be secured to the filter body 82 by resistance welding in the same way the wire would be secured to the rods for conventional wire wrap.

A conventional tubular wire wrap assembly, which is formed in the above-described manner, is removed from a mandrel on which it has been formed and slipped in the lengthwise direction over a filter body with which it is to be used, after which the assembly is immobilized with respect to the filter body, such as by being welded to an inner support member or end connectors for the filter body. Because the wire wrap assembly needs to be able to slide longitudinally over the filter body during installation, there is invariably a gap between the outer periphery of the filter body and the inner periphery of the rods of the wire wrap assembly. This gap may permit significant radial expansion of the filter body during operation of the filter, possibly resulting in damage to the filter body. In contrast, the wrap member 82 of FIGS. 17 and 18 is wrapped around a filter body 20, so the wrap member 82 can closely surround the filter body 20 with little or no gap between the filter body 20 and the wrap member 82, and the filter body 20 may in fact be compressed by the wrap member 82. Thus, in contrast to conventional wire wrap, the wrap member 82 of FIGS. 17 and 18 can reliably restrain the filter body 20 against radially outward expansion and protect it against damage.

Like the wrap member described with respect to FIGS. 10–12, the wrap member 82 of FIGS. 17 and 18 may be the outermost member of a filter, or the wrap member 82 may be surrounded by an external cage or other member to provide additional protection or to provide a smoother outer surface for the filter. When the wrap member 82 is surrounded by an external cage, it is possible to dispose an additional drainage layer between the wrap member 82 and the external cage to ensure good distribution of fluid passing through the cage over the periphery of the wrap member 82.

Figure 19:
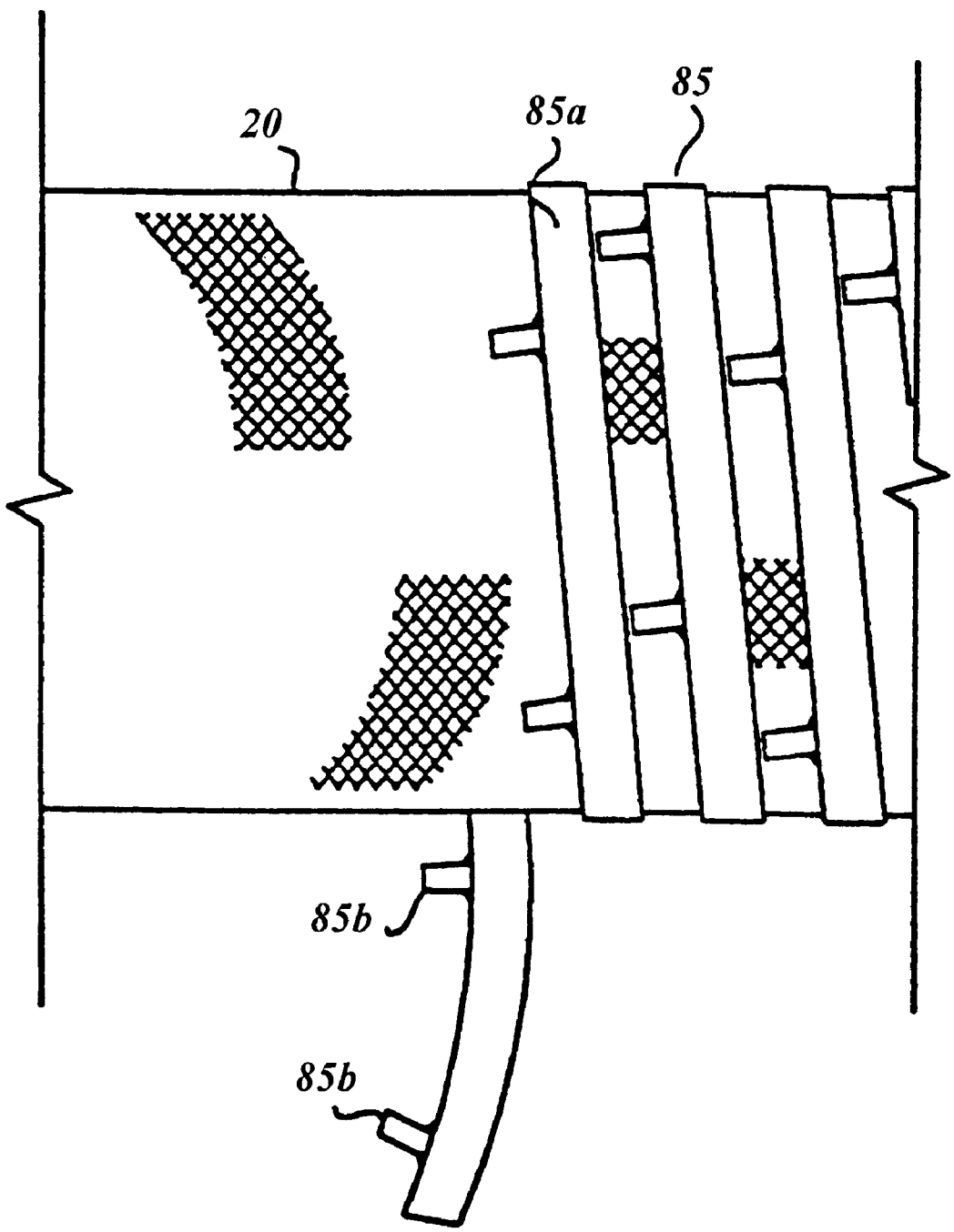
FIG. 19 is a plan view of a filter body being helically wrapped with a wrap member equipped with spacers.

FIG. 19 is a plan view illustrating a variation of the embodiment of FIGS. 10 and 11 in which a restraining member in the form of a wrap member 85 includes spacers 85b disposed on one or both of its widthwise sides to maintain a desired spacing between adjoining turns of the wrap member 85. The spacers 85b may be any members having sufficient strength to resist axial forces tending to change the spacing between adjoining turns of the wrap member 85. In the present embodiment, the wrap member 85 comprises a flexible strip 85a which is helically wrapped around a filter body 20 in a plurality of turns, and spacers 85b comprising substantially rigid pins which are secured to one or both widthwise sides of the strip 85a and extend transversely away from the strip 85a. The illustrated strip 85a has a rectangular transverse cross section, but it may have any other desired shape, such as a house-shaped cross section like that shown in FIGS. 17 and 18. The length of the spacers 85b is selected based on the size of the desired gap between adjoining turns of the strip 85a. The illustrated spacers 85b have a round transverse cross section, but they may have any other desired cross-sectional shape, such as oval or polygonal, e.g., rectangular, and their cross-sectional shape may vary over their length. Each of the illustrated spacers 85b extends along a straight line normal to a widthwise side surface of the strip 85a, but the spacers 85b may extend in any desired direction transverse to the strip 85a and need not be straight. For example, a spacer 85b may extend along an arcuate path. The spacers 85b may be formed integrally with the strip 85a, or they may be formed separately from the strip 85a and then attached to the strip 85a by welding, soldering, crimping, bonding, or any other joining technique suitable for the materials of which the strip 85a and the spacers 85b are made. Frequently, the strip 85a and the spacers 85b will be made of a metal, such as steel, but they may be made of any other suitable materials, including plastics, and they need not be of the same materials as each other. When they are made of metal, resistance welding is frequently a convenient method of joining them to each other.

The spacers 85b may be attached to any convenient portion of the strip 85a, such as to one or both widthwise side surfaces or to the top or bottom surface of the strip 85a. In order to minimize the outer diameter of the filter and/or to make the outer surface of the wrap member 85 as smooth as possible, it may be desirable for the radially outer surface of the spacers 85b to be flush or recessed with respect to the outer surface of the strip 85a. For example, in the present embodiment, each of the spacers 85b is secured to a widthwise side surface of the strip 85a and has a diameter which is substantially the same as the thickness of the strip 85a so that the radially outer surfaces of the spacers 85b are flush with the radially inner and outer surfaces of the strip 85a. In FIG. 19, the spacers 85b are shown extending transversely from one widthwise side of the strip 85a, but they may extend from the opposite widthwise side or from both widthwise sides of the strip 85a.

The number of spacers 85b per turn of the wrap member 85 can be any number which can provide sufficient strength to resist changes in spacing between adjoining turns, which number will depend upon factors such as the stiffness of the strip 85a, the diameter of the filter body around which the wrap member 85 is disposed, and the level of forces expected to be encountered during installation or operation of a filter equipped with the wrap member 85. Thus, there may be one or a plurality of spacers 85b per turn of the wrap member 85.

Usually it is easier to attach the spacers 85b to the strip 85a prior to wrapping the wrap member 85 around the filter body 20, but it is also possible to do so afterwards. An example of a method of forming spacers 85b on a wrap member 85 is to place a metal wire against a widthwise side surface of a metal strip, weld the wire to the strip 85a by resistance welding or other suitable welding technique, and then cut the wire at a predetermined distance from the widthwise side surface, the distance depending upon the desired spacing between adjoining turns of the wrap member. The strip can then be advanced a predetermined distance in its lengthwise direction, and the above process of welding the wire to the strip and cutting the wire to a desired length can be repeated. The process of forming the spacers 85b can be performed immediately before the wrap member 85 is to be wrapped around a filter body 20, or the completed wrap member 85 can be coiled and stored after forming the spacers 85b and prior to being wrapped around a filter body 20.

The wrap member 85 is preferably wrapped around the filter body 20 such that the outer end of each spacer 85b abuts or is in close proximity to the widthwise side surface of the strip 85a of an adjoining turn of the wrap member 85. Preferably, the gap between the outer end of each spacer 85b and the adjoining turn of the wrap member 85 when no force in the axial direction of the filter is acting on the wrap member 85 is as small as possible, such as at most approximately 0.010 inches, and more preferably the gap is substantially zero with the outer end of each spacer 85b abutting the widthwise side surface of the adjoining turn. If an axial force is applied to a portion of the wrap member 85, such as if a portion of the wrap member 85 catches on an object when a filter equipped with the wrap member 85 is being installed in a well, the spacers 85b will contact the widthwise side surfaces of the adjoining turns of the wrap member to prevent a change in the spacing between the turns. The reason for minimizing the size of any gap and more preferably substantially eliminating any gap between the outer end of each spacer 85b and the adjoining turn of the wrap member 85 is that if any axial force is applied to the wrap member 85 and adjoining turns are moved towards each other by the size of the gap, the amount of movement can accumulate over the length of the filter, resulting in a significant change in the spacing between adjoining turns of the wrap member 85 somewhere along the length of the filter. As in the previous embodiments employing a wrap member, the wrap member 85 of this embodiment can be disposed around a filter body with any desired degree of tightness, ranging from a loose fit to a tight fit. The wrap member 85 may be secured to the filter body by welding or other method at one or more locations along its length, or it may be immobilized only at its ends to end connectors of the filter, for example, without being secured to the filter body.

Figure 20:
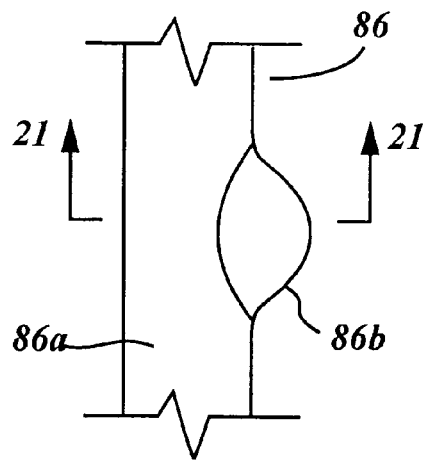
FIG. 20 is a plan view of yet another example of a wrap member with spacers.
Figure 21:
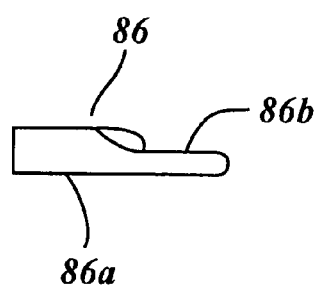
FIG. 21 is a cross-sectional view taken along line 21—21 of FIG. 20.
Figure 22:
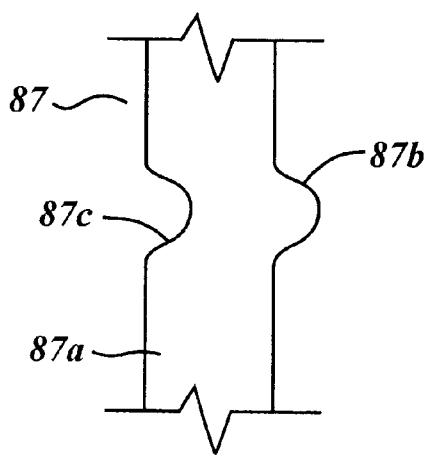
FIGS. 22 and 23 are plan views of other examples of wrap members equipped with spacers.
Figure 23:
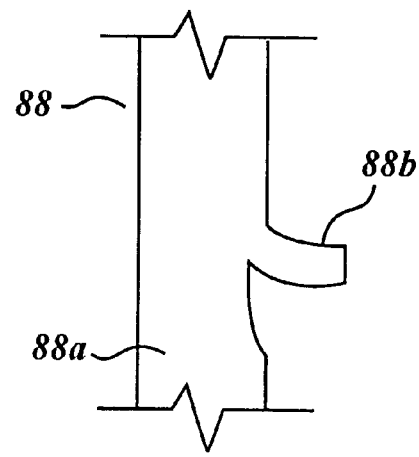

FIGS. 20–23 illustrate other examples according to the present invention of wrap members equipped with spacers. FIGS. 20 and 21 are respectively a plan view and a cross-sectional view taken along line 21—21 of FIG. 20 of a portion of a wrap member 86 having spacers 86b which are integral with a strip 86a of metal from which the wrap member 86 is formed. The spacers 86b can be formed by upsetting a widthwise edge of the metal strip 86a with an upsetting die to cause the strip 86a to bulge in its widthwise direction and form lateral projections which can each act as a spacer in the same manner as the spacers 85b of FIG. 19. FIG. 22 illustrates a portion of another wrap member 87 comprising a metal strip 87a which has been deformed at intervals to form spacer 87b in the form of projections (only one of which is shown) extending in a widthwise direction of the strip 87a. The illustrated spacer 87b is coplanar with the strip 87a but need not be. A corresponding recess 87c is formed in the opposite widthwise side of the strip 87a. The distance between spacers 87b measured in the lengthwise direction of the strip 87a is selected such that when the wrap member 87 is wrapped around a filter body in a plurality of turns, each spacer 87b will not engage with the recess 87c in the adjoining turn of the wrap member 87. FIG. 23 illustrates a portion of another wrap member 88 in which tabs are sheared from a metal strip 88a and bent to project transversely from the strip 88a to form spacers 88b. The illustrated spacer 88b is substantially flat and coplanar with the strip 88a, but it need not be either flat or coplanar. Each of the wrap members 86, 87, 88 of FIGS. 20–23 can be wrapped around a filter body in the same manner as shown in FIG. 19, with the outer end of each spacer abutting or closely spaced from a widthwise side surface of an adjoining turn of the wrap member.

The size of the gap between adjoining turns of a wrap member equipped with spacers can be the same as in any of the other embodiments of the present invention equipped with a wrap member. For example, it can be large enough that the wrap member performs substantially no removal of particles from the fluid being filtered, or it may be selected so that the wrap member can remove particles of a desired size from the fluid being filtered, such as in the embodiment of FIGS. 17 and 18. Thus, spacers may be applied to various types of wrap member, such as the wrap member 82 of FIGS. 17 and 18.

A filter according to the present invention is not restricted to all of the features in any one of the above embodiments, and one or more features of one embodiment may be freely combined with one or more features of any other of the embodiments without departing from the scope of the present invention.

What is claimed is:

1. A filter for subterranean use comprising:
    a hollow filter body including a filter medium; and
    a perforated cage which surrounds the filter body and is plastically deformed radially inwards towards an outer periphery of the filter body so that an outer periphery of the filter body can contact an inner periphery of the cage around an entire circumference of the filter body without exceeding a maximum allowable elongation of the filter body.

2. A filter as claimed in claim 1 including an inner support member surrounded by the filter body.

3. A filter as claimed in claim 1 wherein the cage comprises a perforated steel tube.

4. A filter as claimed in claim 3 wherein the tube has perforations elongated in a lengthwise direction of the tube by the plastic deformation.

5. A filter as claimed in claim 1 wherein the cage is deformed over an entire length of the filter body.

6. A filter as claimed in claim 5 wherein the cage is uniformly deformed over the entire length of the filter body.

7. A filter as claimed in claim 1 wherein the cage is uniformly deformed around its periphery.

8. A filter as claimed in claim 1 wherein the inner periphery of the cage contacts the outer periphery of the filter body when there is no differential pressure between an interior and an exterior of the filter.

9. A filter as claimed in claim 8 wherein the inner periphery of the cage is compressed against the outer periphery of the filter body when there is no differential pressure between an interior and an exterior of the filter.

10. A filter as claimed in claim 1 wherein the outer periphery of the filter body is spaced from the inner periphery of the cage when there is no differential pressure between an interior and an exterior of the filter.

11. A filter as claimed in claim 1 wherein an inner diameter of the cage increases towards its lengthwise ends.

12. A filter as claimed in claim 1 including end connectors surrounding the inner support member and secured to lengthwise ends of the cage, the cage having a minimum inner diameter smaller than a maximum outer diameter of each end connector.

13. A method of forming a filter for subterranean use comprising:
    disposing a perforated cage around a filter body including a filter medium; and
    plastically deforming the cage radially inwards to reduce an inner diameter thereof.

14. A method as claimed in claim 13 including reducing the inner diameter of the cage to a value such that an outer periphery of the filter body can contact an inner periphery of the cage around an entire circumference of the filter body without exceeding a maximum allowable elongation of the filter body.

15. A method as claimed in claim 13 wherein the cage comprises a perforated steel tube.

16. A method as claimed in claim 13 including restraining lengthwise ends of the cage against axial elongation while deforming the cage.

17. A method as claimed in claim 13 comprising plastically deforming the cage with a swaging mechanism.

18. A method as claimed in claim 13 including disposing the cage around the filter body with a radial clearance.

19. A method as claimed in claim 13 including reducing the inner diameter of a midportion of the cage more than the inner diameter of lengthwise ends of the cage.

20. A filter for subterranean use comprising:
    a hollow filter body containing a filter medium; and
    a wrap member helically wrapped around the filter body in a plurality of turns, the wrap member having a non-circular transverse cross section and being twisted around a longitudinal axis thereof.

21. A filter as claimed in claim 20 wherein adjoining turns of the wrap member contact each other.

22. A filter as claimed in claim 20 including spaces through the wrap member through which particles measuring approximately 0.015 inches in diameter can pass to reach the filter body.

23. A filter as claimed in claim 20 wherein the wrap member has a rectangular transverse cross section.

24. A filter as claimed in claim 20 wherein the wrap member comprises steel.

25. A filter for subterranean use comprising:
    a hollow filter body containing a metallic filter medium; and
    a wrap member helically wrapped around the filter body and defining openings for fluid through which particles measuring approximately 0.015 inches in diameter can pass to reach the filter body.

26. A filter as claimed in claim 25 wherein the wrap member radially compresses the filter body.

27. A filter as claimed in claim 25 wherein the wrap member is not secured to the filter body.

28. A filter as claimed in claim 25 wherein the filter medium comprises a porous metal.

29. A filter as claimed in claim 28 wherein the filter medium comprises a porous sintered metal.

30. A filter for subterranean use comprising:
    a hollow filter body containing a metallic filter medium capable of resisting tension in a circumferential direction of the filter body; and a perforated cage surrounding the filter body, an outer periphery of the filter body being able to contact an inner periphery of the cage around an entire circumference of the filter body without exceeding a maximum allowable elongation of the filter body, wherein an inner diameter of the cage increases towards lengthwise ends of the cage.

31. A filter as claimed in claim 30 wherein the inner periphery of the cage is radially spaced from the outer periphery of the filter body when there is no differential pressure between an interior and an exterior of the filter.

32. A filter as claimed in claim 30 wherein the cage comprises a steel tube.

33. A filter as claimed in claim 30 wherein the cage can withstand a pressure within the filter which is at least approximately 200 psi greater than a pressure on the outside of the filter without the filter body exceeding its maximum allowable elongation.

34. A filter as claimed in claim 30 wherein the cage can withstand a pressure within the filter which is at least approximately 1000 psi greater than a pressure on the outside of the filter without the filter body exceeding its maximum allowable elongation.

35. A filter as claimed in claim 30 wherein the cage can withstand a pressure within the filter which is at least approximately 2000 psi greater than a pressure on the outside of the filter without the filter body exceeding its maximum allowable elongation.

36. A filter as claimed in claim 30 wherein the filter medium comprises a porous metal.

37. A filter as claimed in claim 30 wherein the filter medium comprises a porous sintered metal.

38. A filter as claimed in claim 30 wherein the filter medium comprises a sintered metal supported porous medium.

39. A filter arrangement for subterranean use comprising:
   a filter according to claim 1, 20, 25 or 30 disposed in a well; and
   a fluid transporting member in fluid communication with the filter for transporting a fluid between an interior of the filter and an exterior of a well.

40. A filter arrangement as claimed in claim 39 wherein the fluid transporting member comprises a pipe string.

41. A filter arrangement as claimed in claim 39 wherein the fluid transporting member comprises coiled tubing.

42. A filter arrangement as claimed in claim 39 wherein the fluid transporting member comprises a downhole pump.

43. A filter arrangement as claimed in claim 39 wherein the fluid transporting member comprises another filter.

* * * * *